June 5, 1962  A. D. STOLLE ETAL  3,038,040
TIMING MECHANISM
Filed Oct. 14, 1957  16 Sheets-Sheet 1
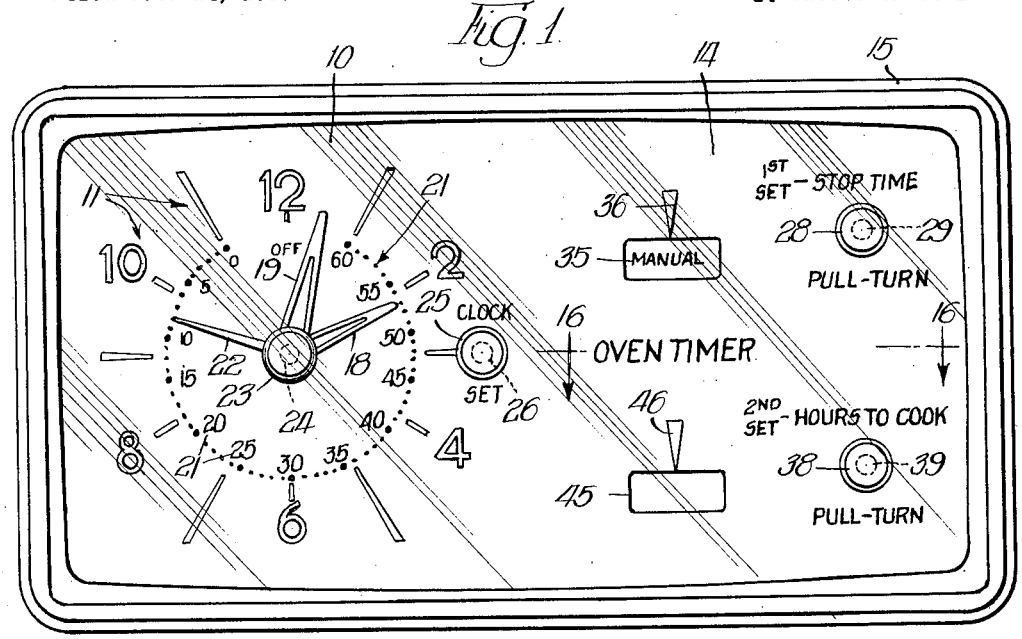
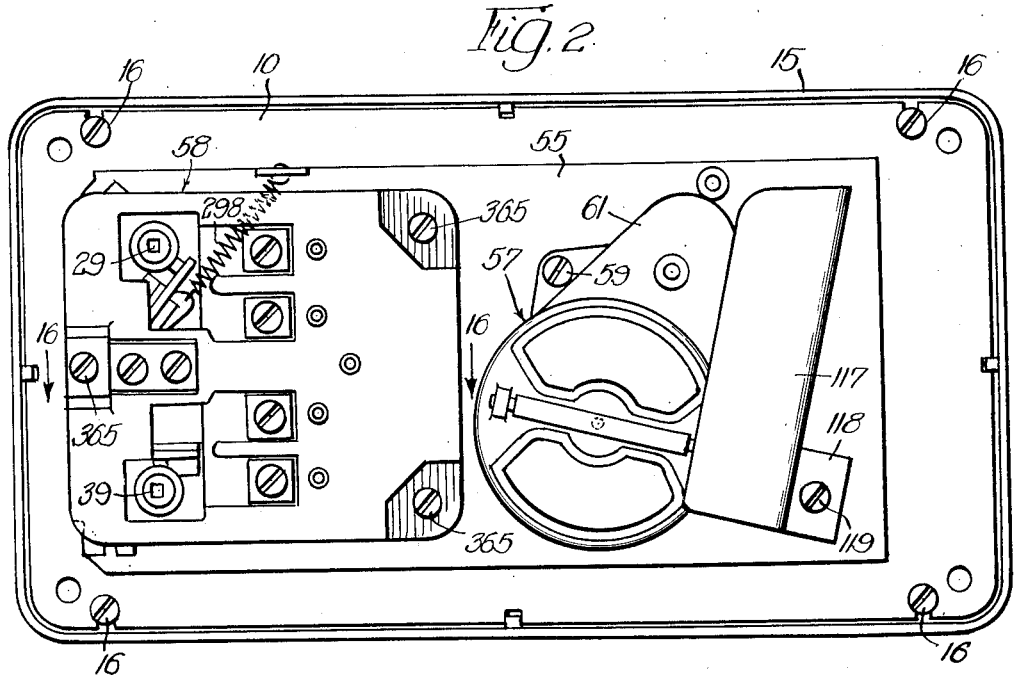
INVENTORS
Anthony D. Stolle,
BY Richard J. Dykinga,
Brown, Jackson,
Boettcher & Dienner
ATTYS June 5, 1962  A. D. STOLLE ETAL  3,038,040
TIMING MECHANISM
Filed Oct. 14, 1957  16 Sheets-Sheet 2
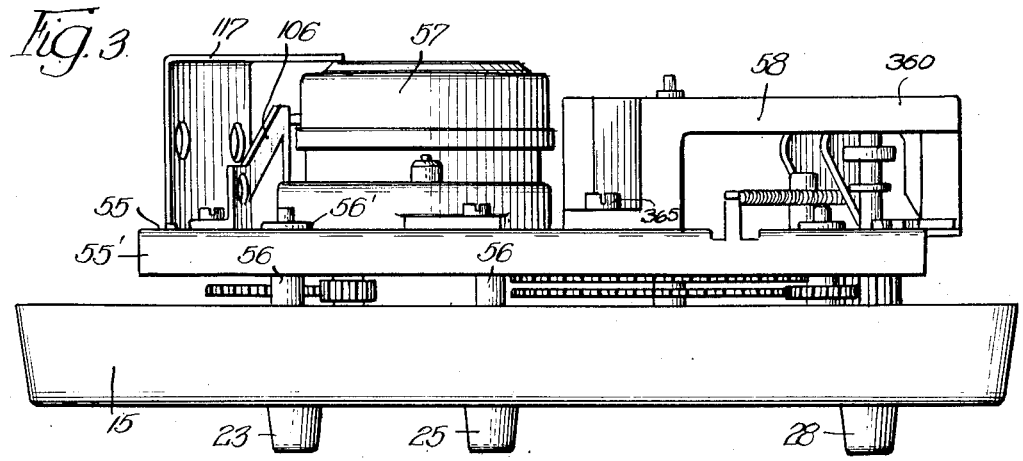
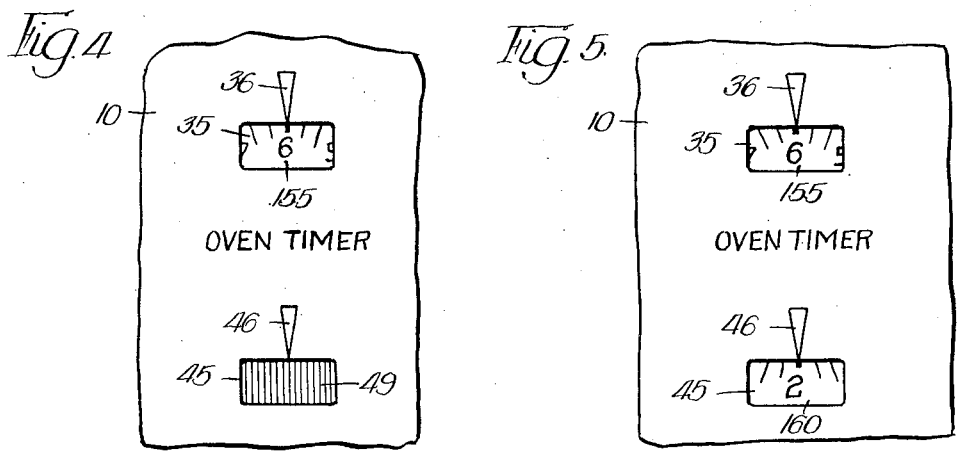
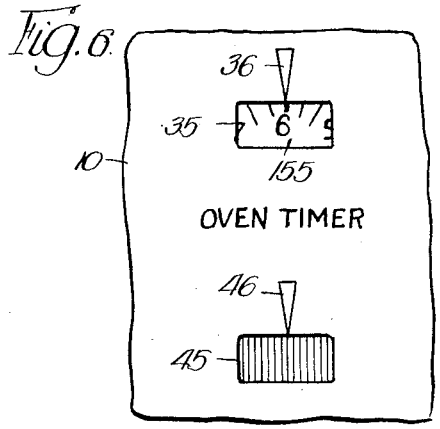 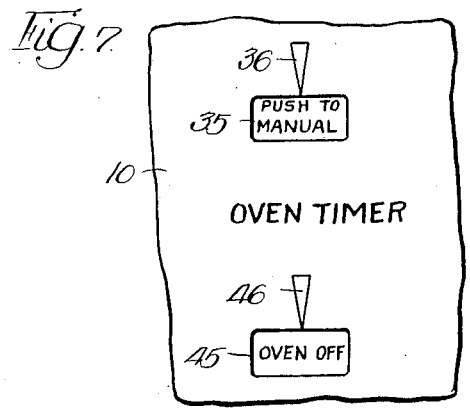
INVENTORS
Anthony D. Stolle,
By Richard J. Dykinga,
Brown, Jackson,
Boettcher & Dienner
Attys

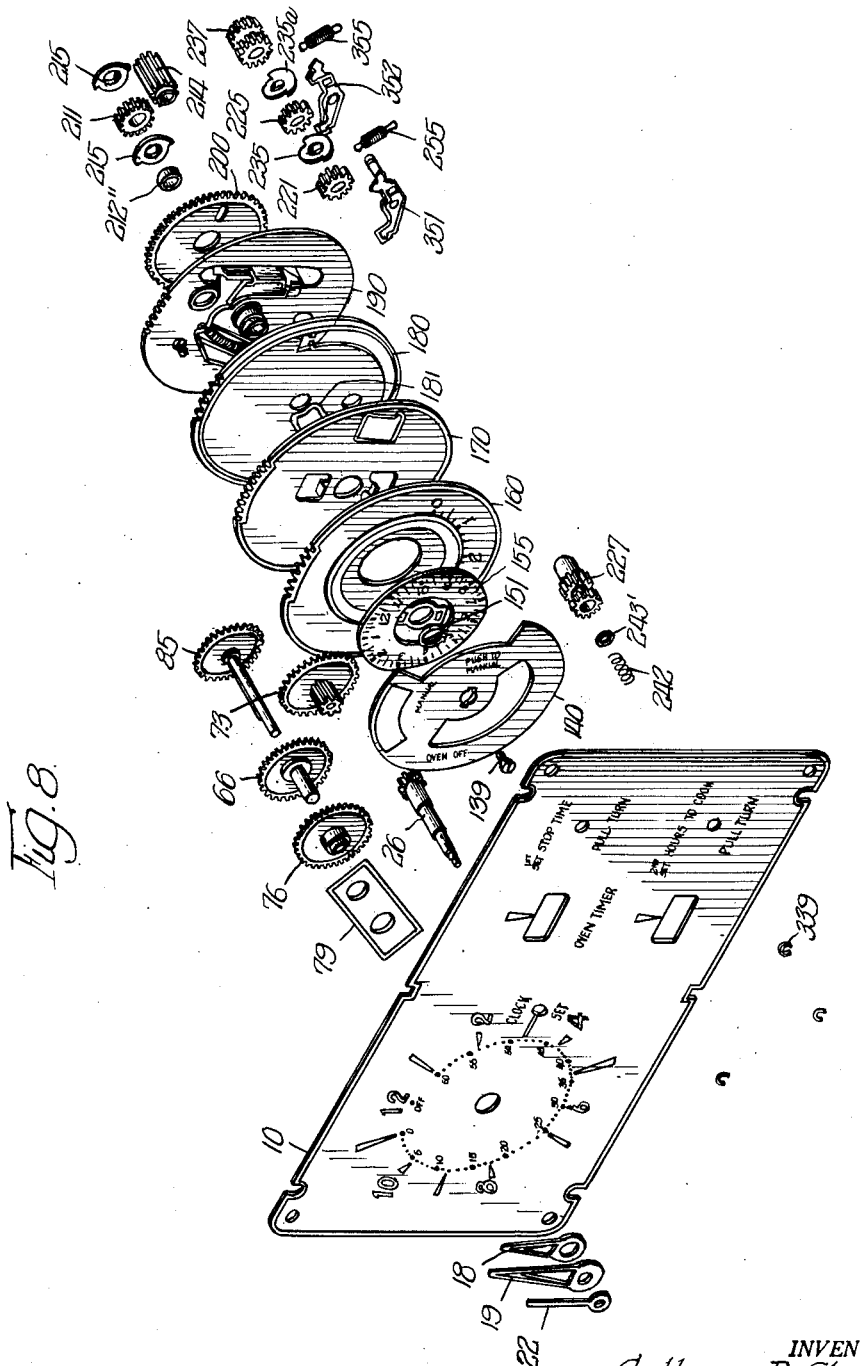

June 5, 1962 A. D. STOLLE ETAL 3,038,040
TIMING MECHANISM
Filed Oct. 14, 1957 16 Sheets-Sheet 4
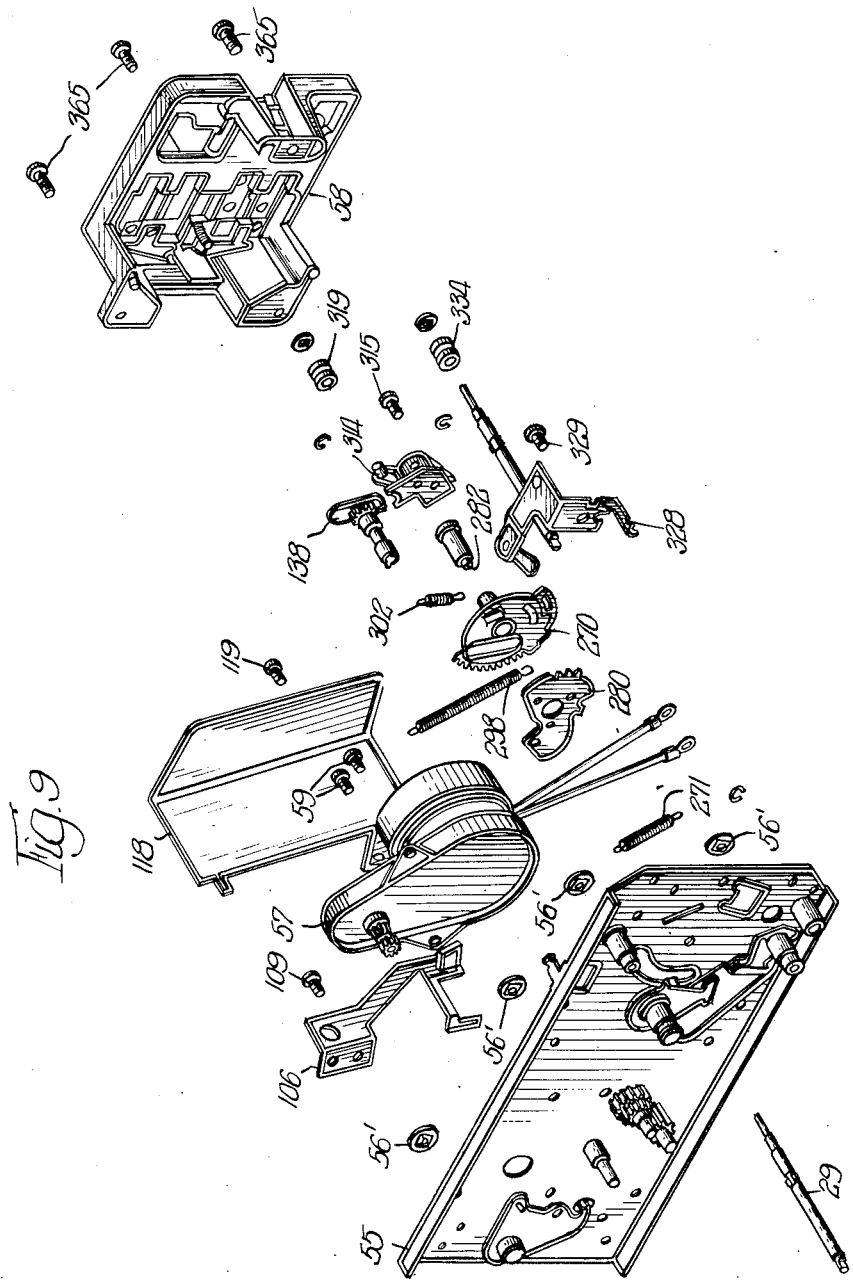
INVENTORS.
Anthony D. Stolle,
Richard J. Dykinga,
By Brown, Jackson, Boettcher & Dienner
Attys June 5, 1962 A. D. STOLLE ETAL 3,038,040
TIMING MECHANISM
Filed Oct. 14, 1957 16 Sheets-Sheet 5
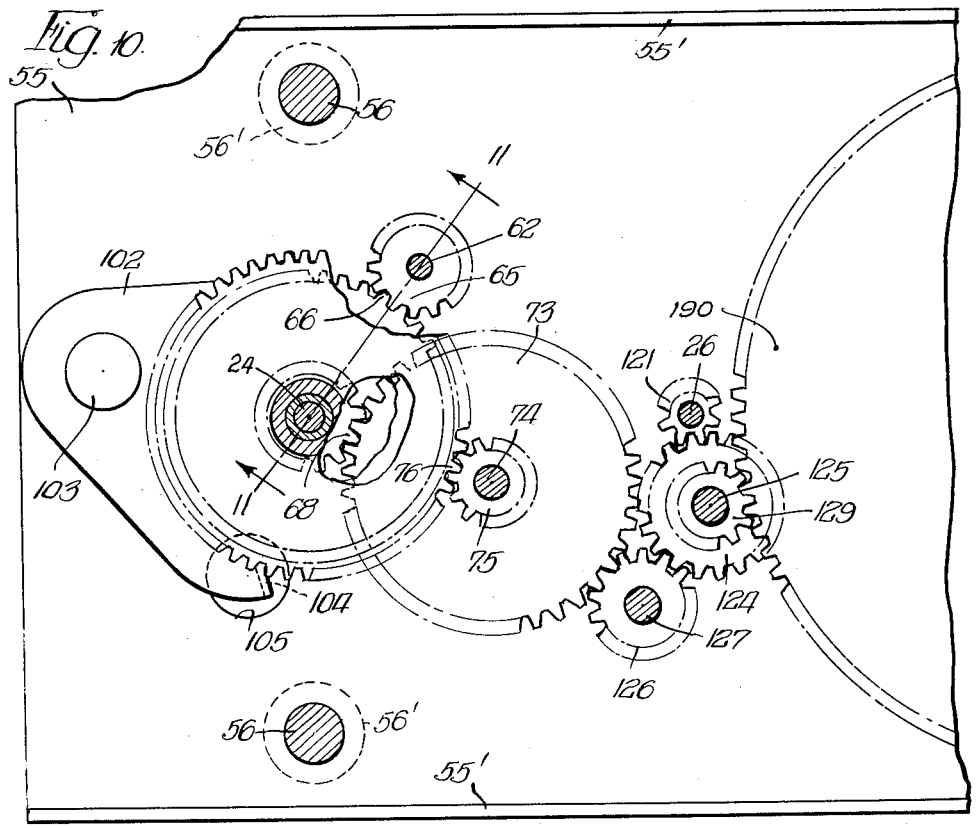
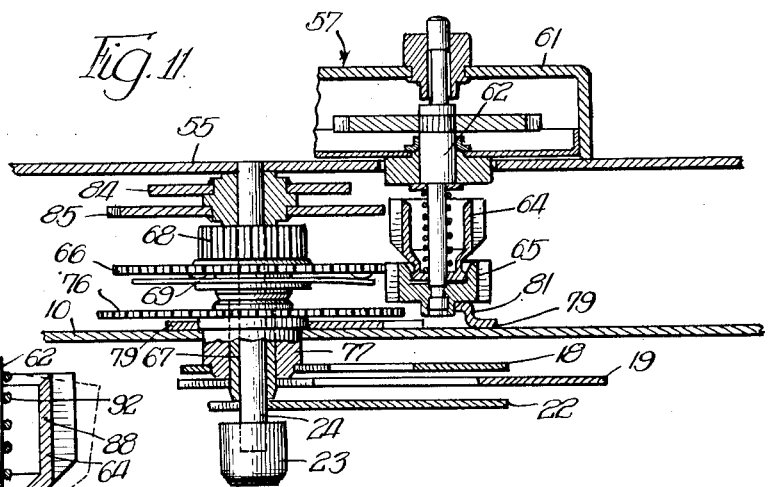
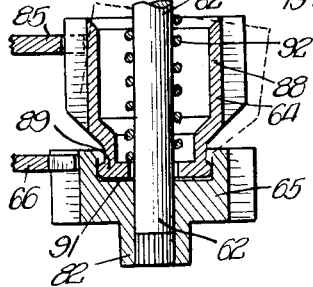
INVENTORS.
Anthony D. Stolle,
BY Richard J. Dykinga,
Brown, Jackson,
Boettcher & Dienner
Attys

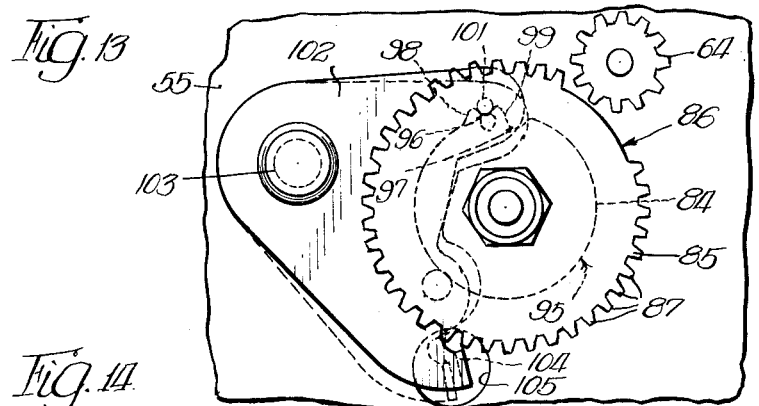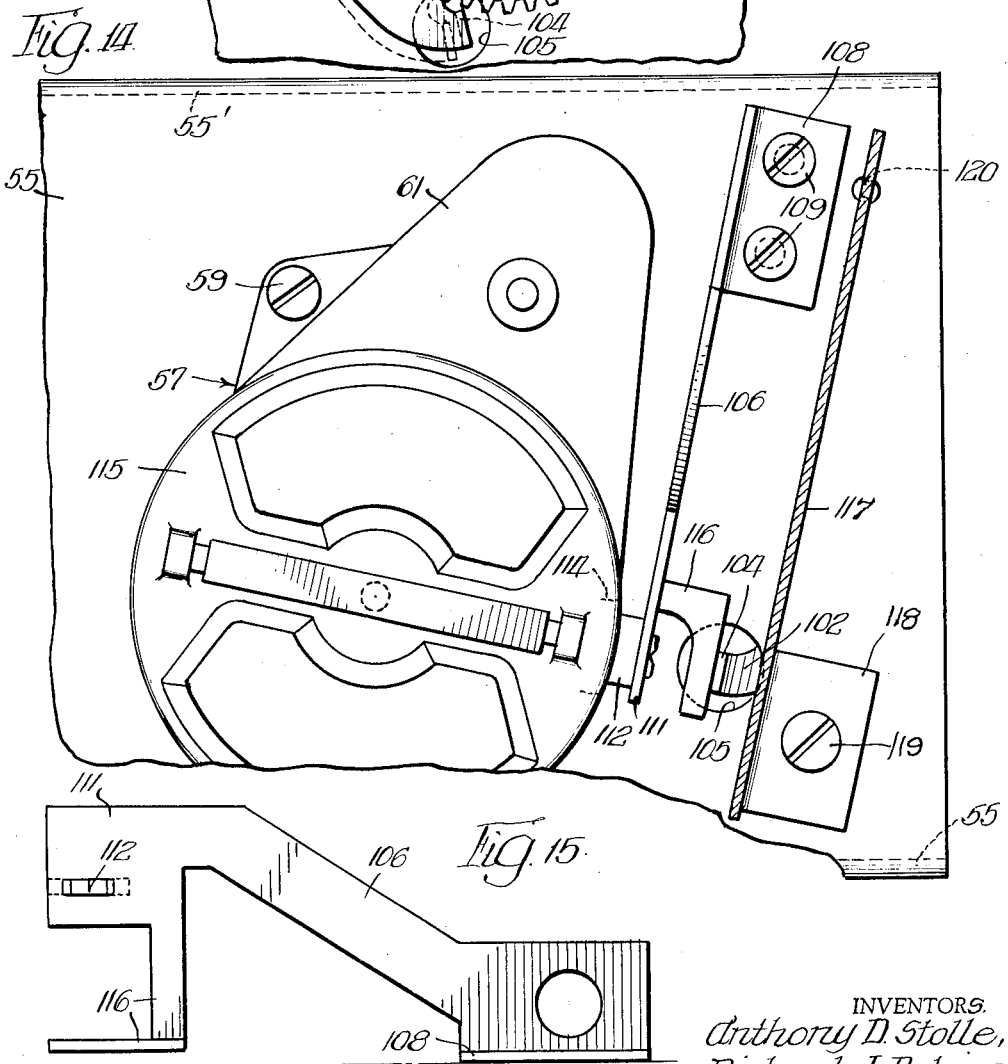

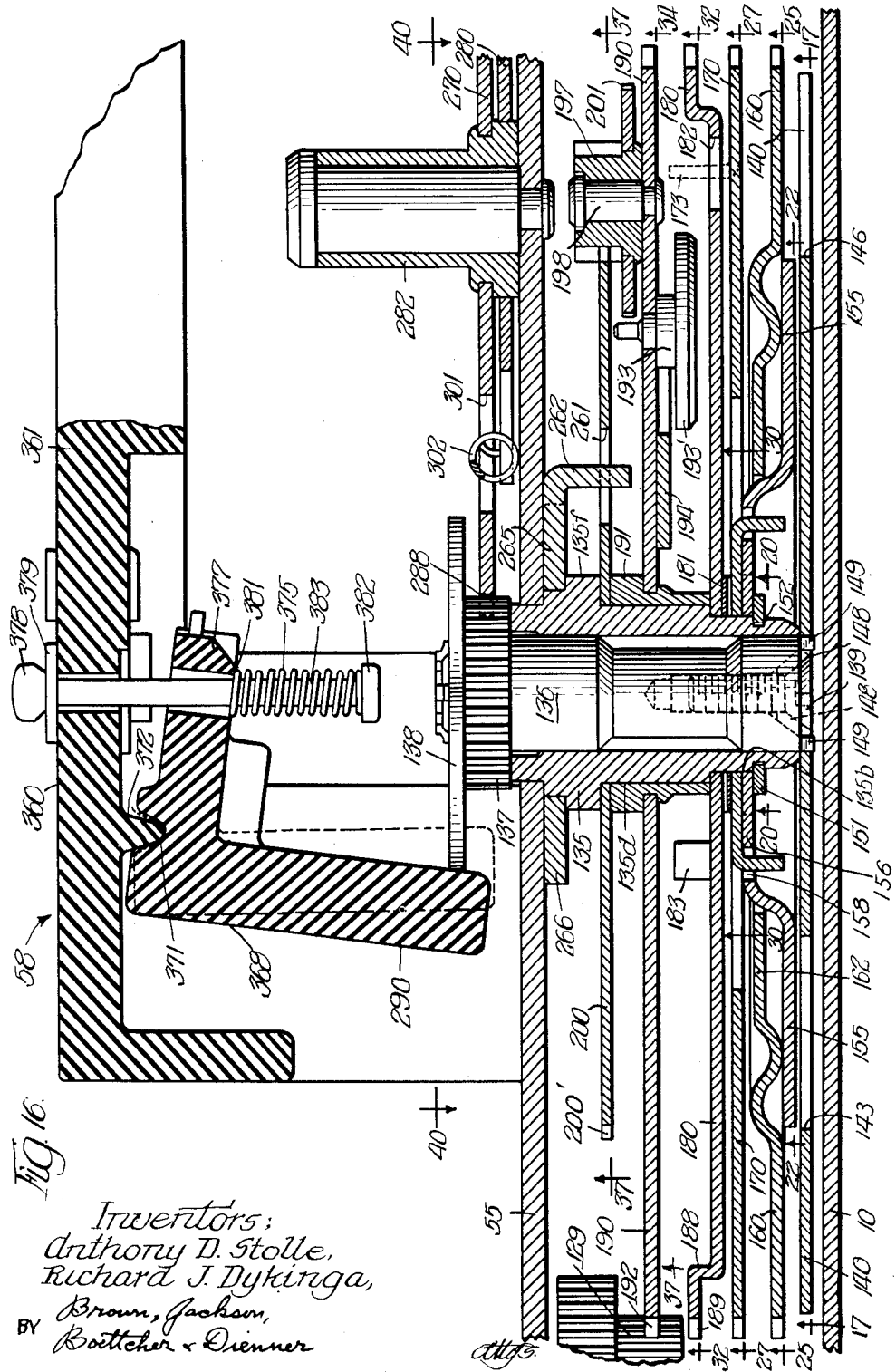

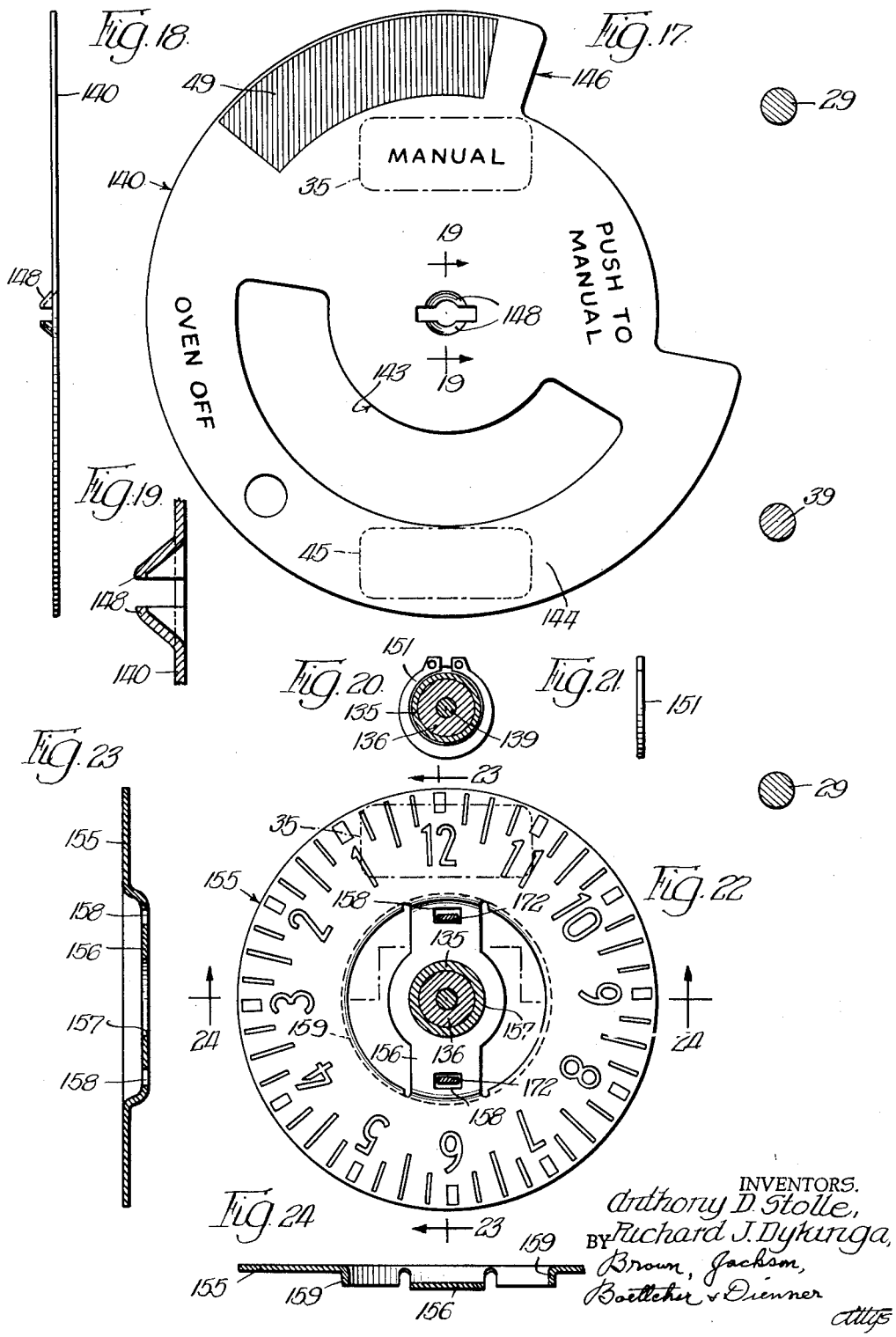

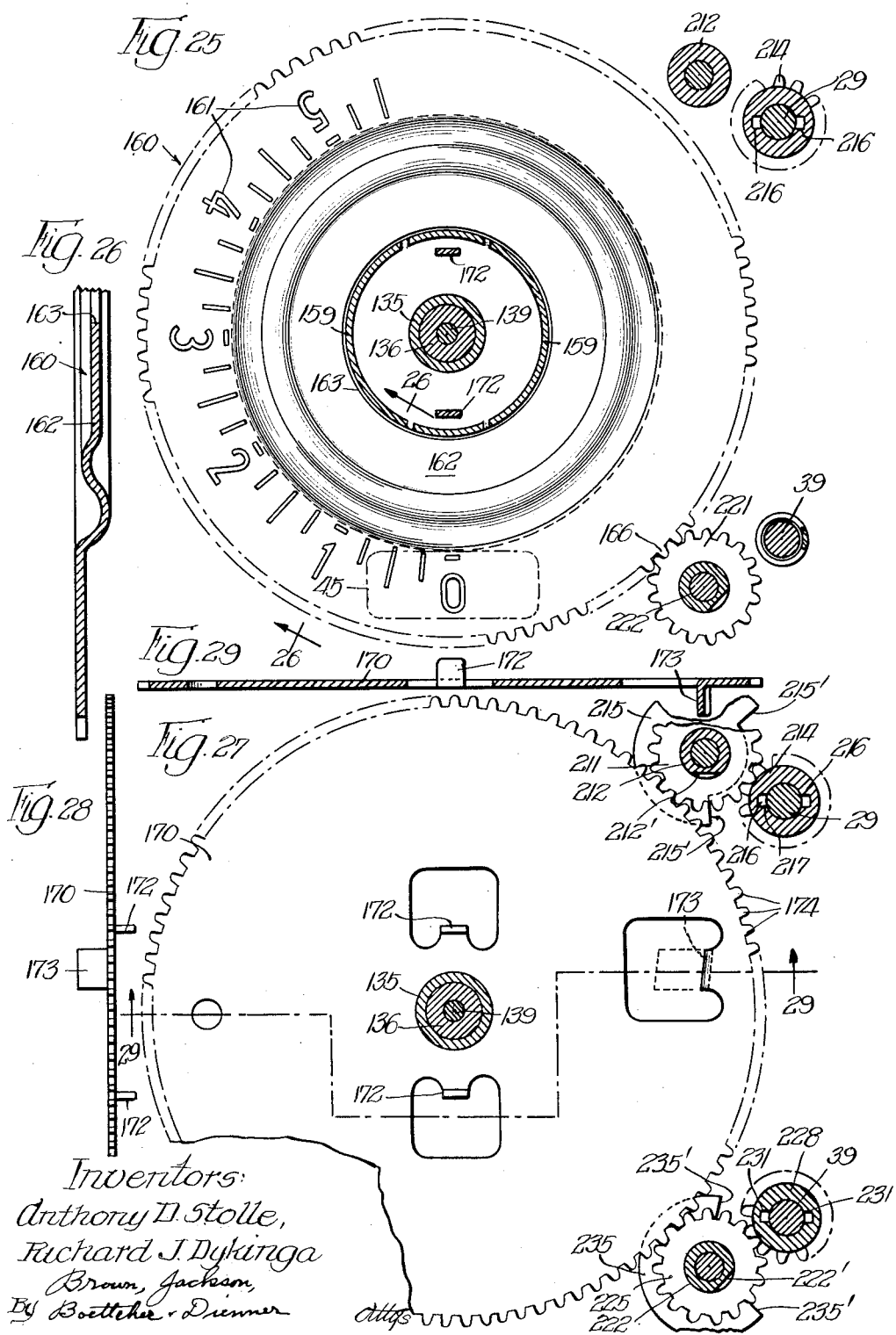

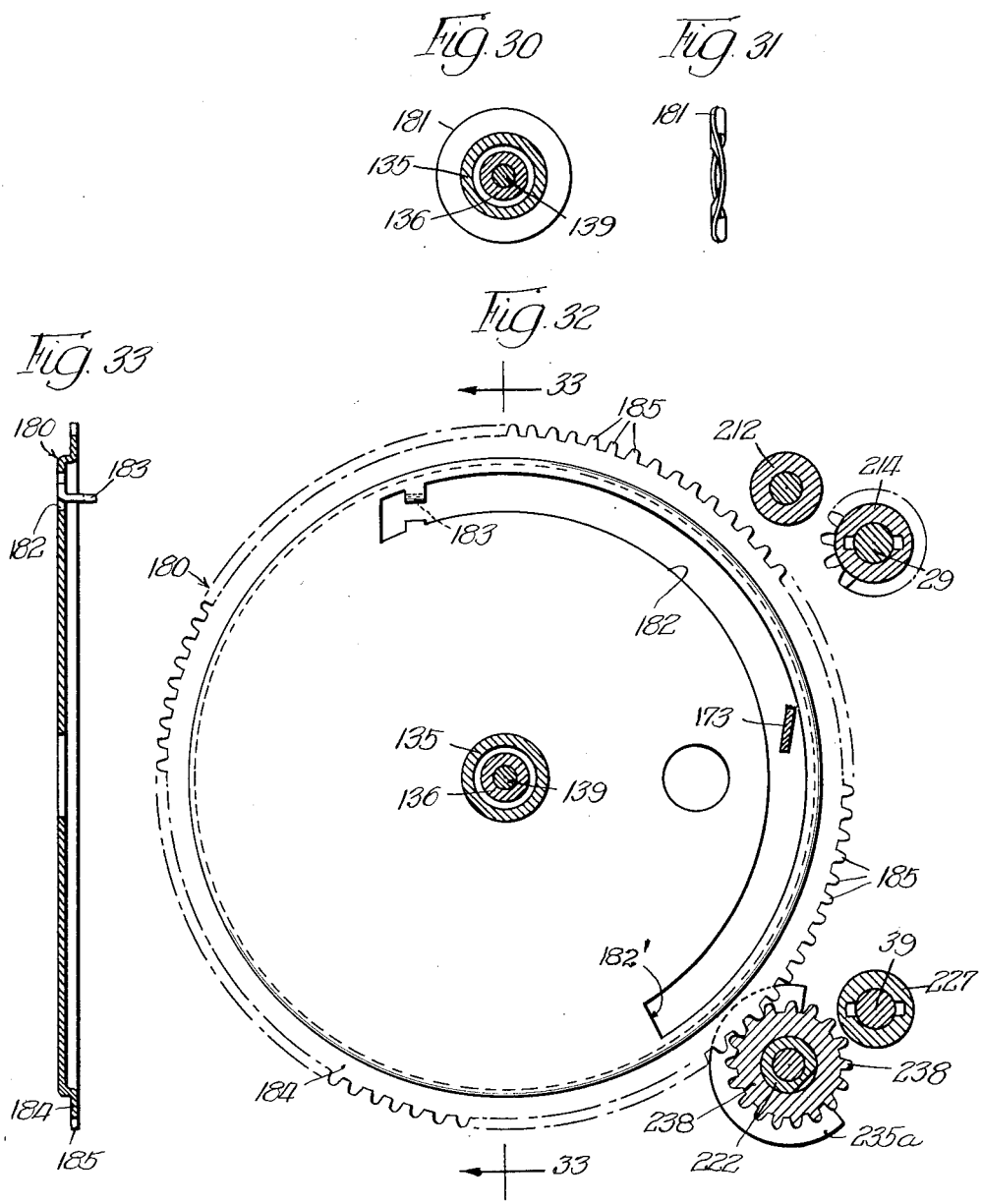

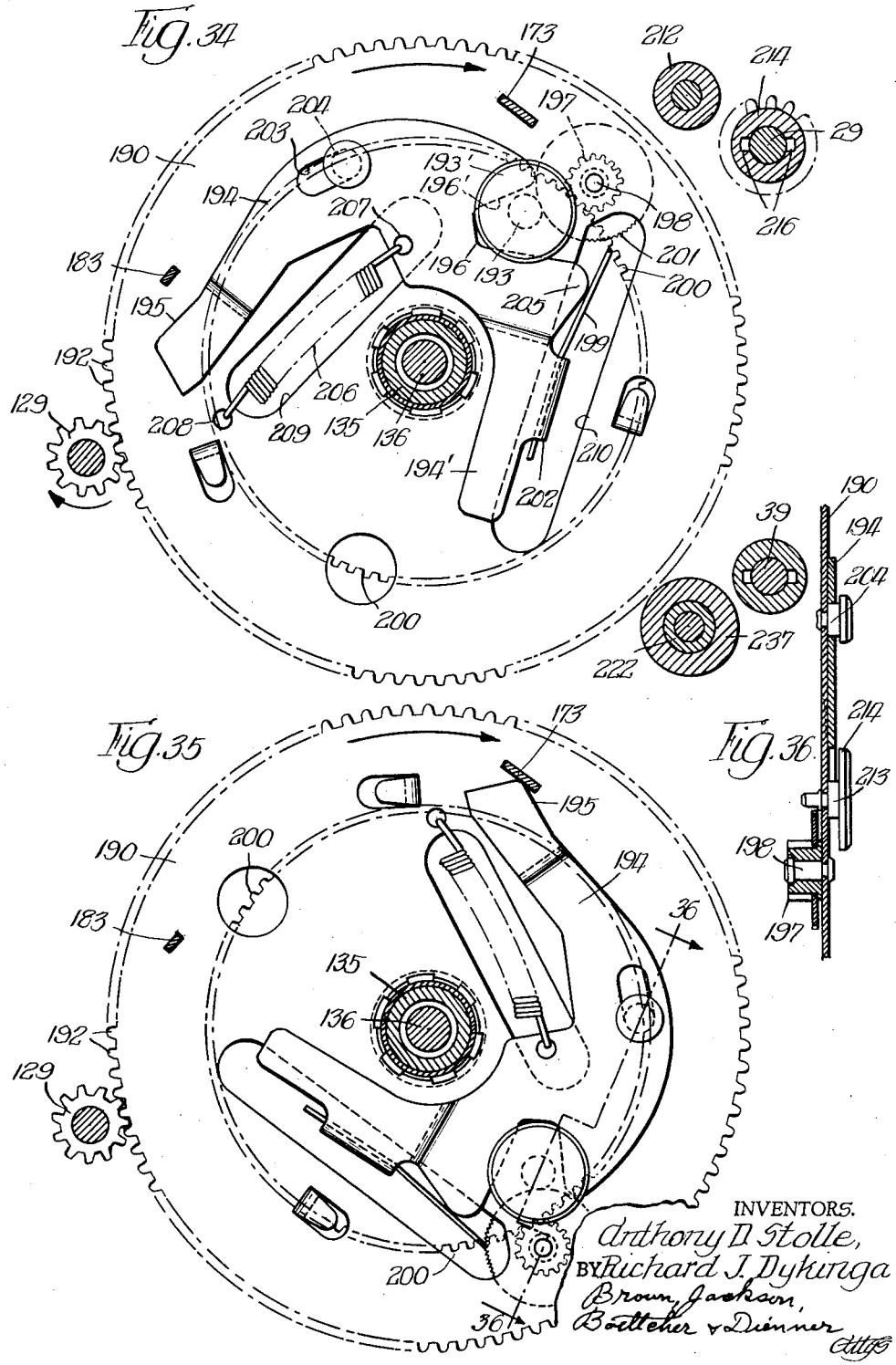

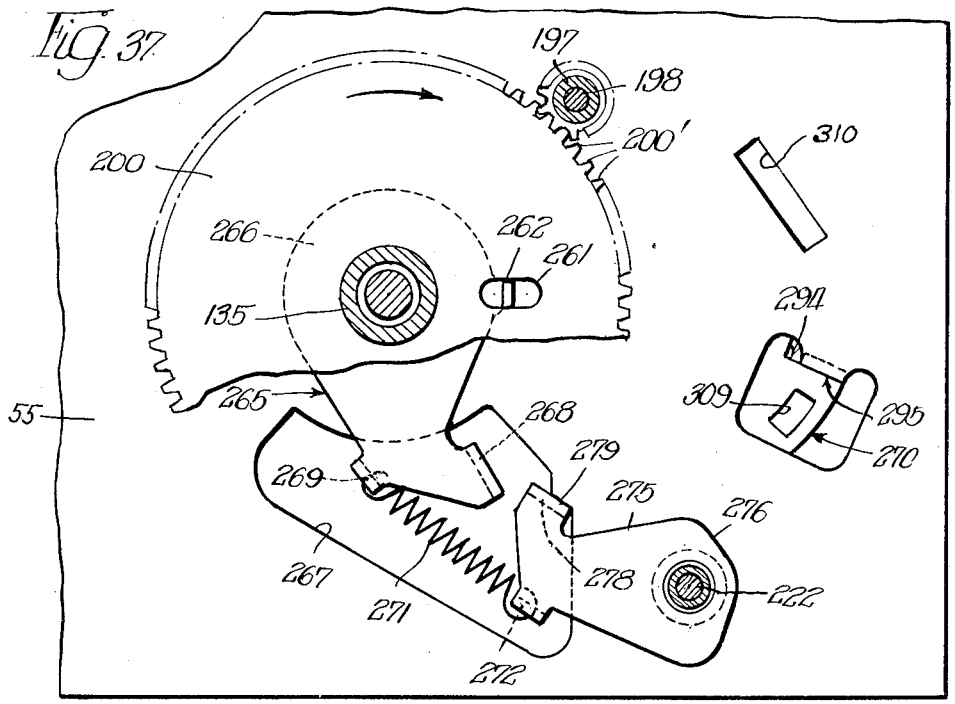
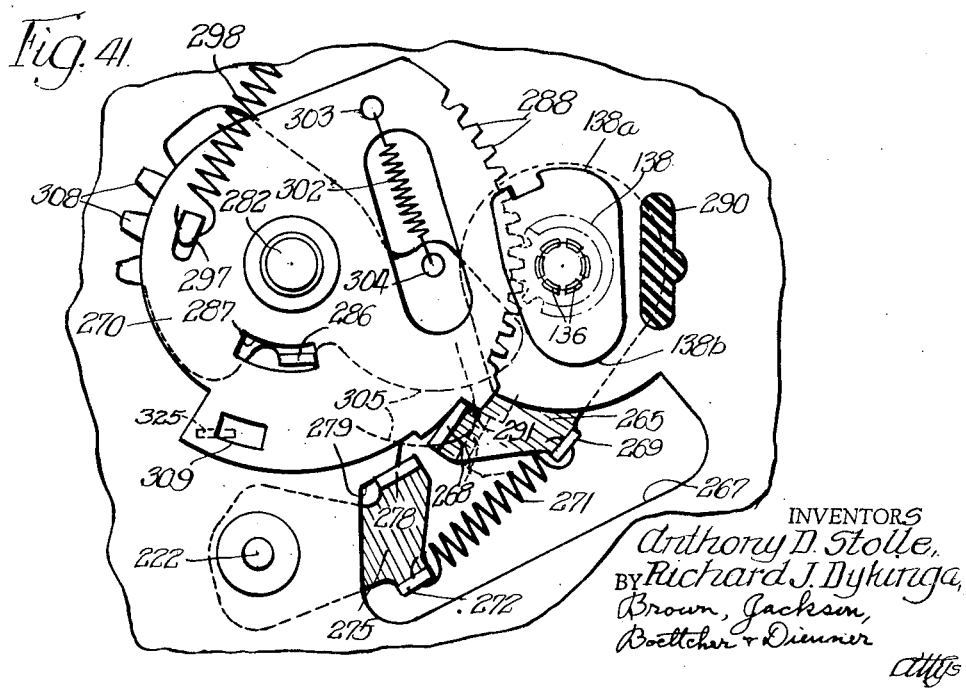

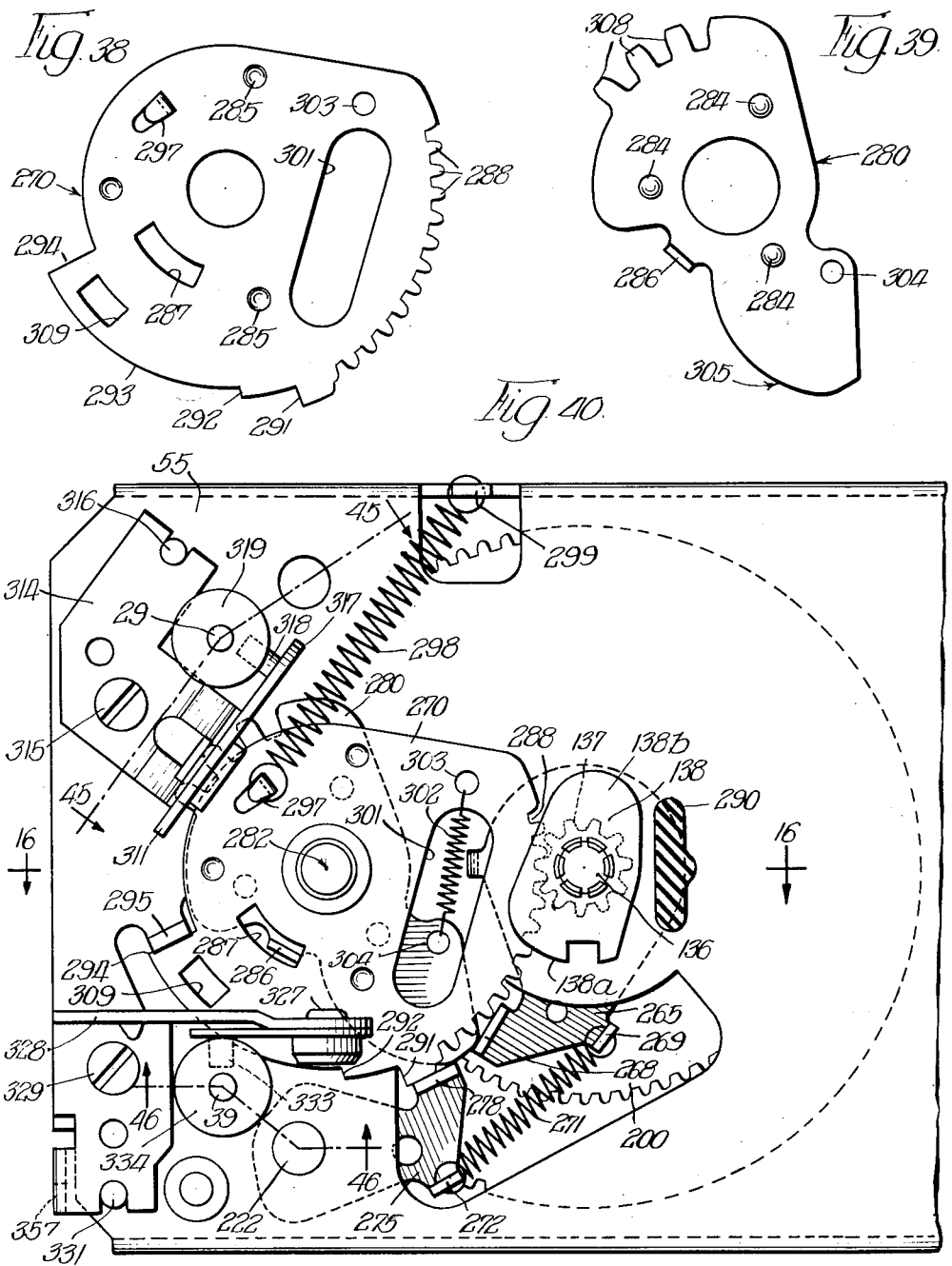

INVENTORS
Anthony D. Stolle,
BY Richard J. Dykinga,
Brown, Jackson,
Boettcher & Dienner
ATTYS

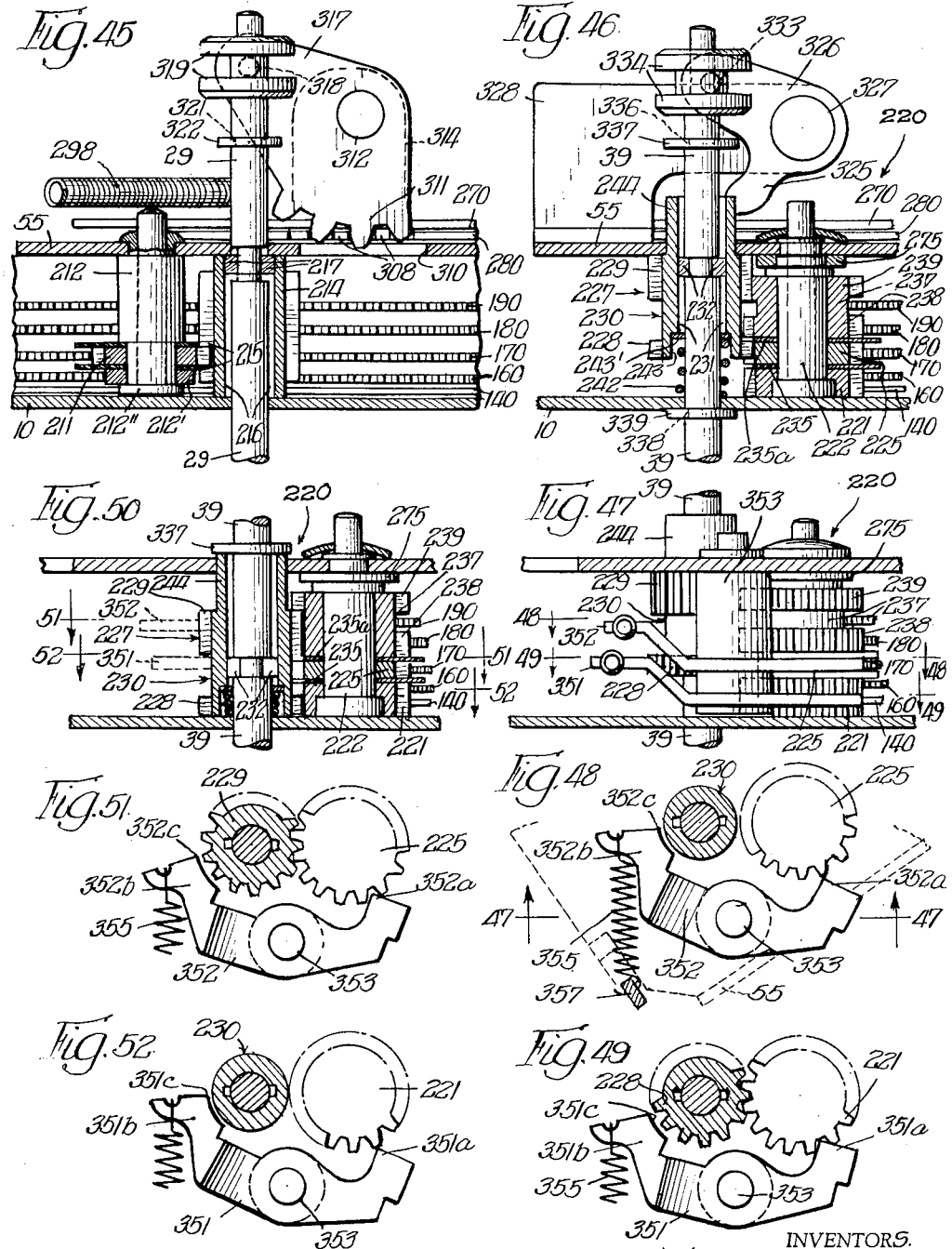

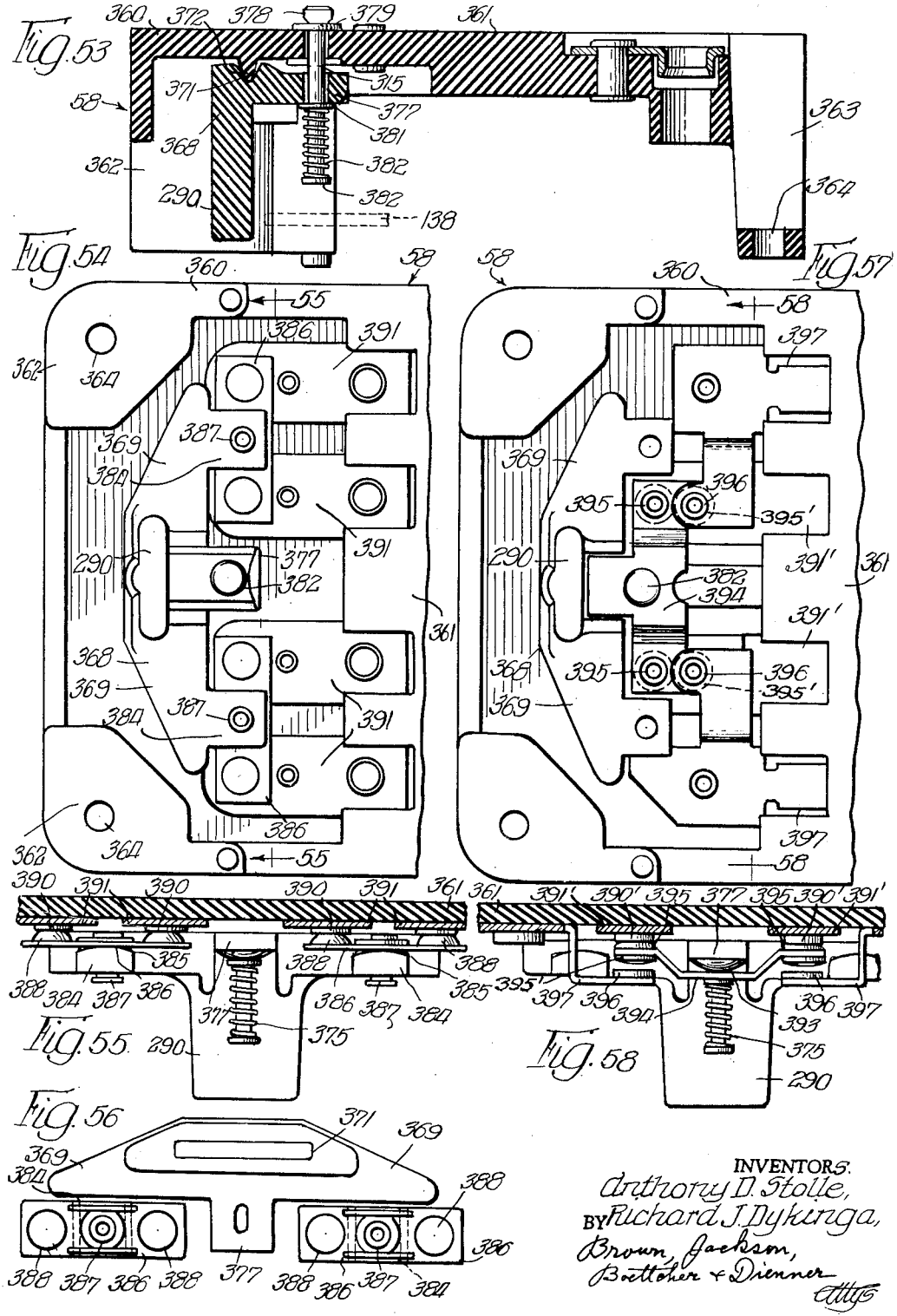

United States Patent Office 3,038,040
Patented June 5, 1962

3,038,040
TIMING MECHANISM
Anthony D. Stolle and Richard J. Dykinga, Chicago, Ill., assignors to International Register Company, a corporation of Illinois
Filed Oct. 14, 1957, Ser. No. 689,877
22 Claims. (Cl. 200—38)

The present invention relates to timing mechanisms particularly in the field of electrical time switches adapted for automatically closing and opening electrical circuits at preselected times. For the purpose of illustrating an exemplary embodiment, we have shown the invention in the form of an automatic timer for electric cooking ovens, cooking ranges and the like, but it will be understood that the invention is not necessarily limited thereto. These range timers enable the housewife to set the electric range or oven for automatically performing a cooking operation of a predetermined length of time or duration, and for automatically terminating this cooking operation at a certain predetermined time. These range timers are usually connected in series with the so-called "Manual" switch, which is a manually operated thermostatic switch that is standard equipment on the electric range, and by the use of which the range is made subject to manual thermostat control when it is not subject to the automatic timer control. Because of the series circuit connection, the automatic timer must be placed in closed circuit condition in order to make the manual thermostatic switch effective.

In order to obtain the complete utility of these automatic range timers, it is necessary that the housewife understand the operation and function of at least three different control steps. One of these control steps is the setting of the "Stop Time" control to establish the time when the cooking operation is to automatically stop. The second control step which she should understand is the setting of the "Cooking Hours" control which predetermines the number of hours or the duration of the cooking operation. The third control step is the placing of the automatic range timer back on "Manual," which closes the control circuit through the range timer so that the control of the range is then restored to the aforementioned "Manual" switch. Failure to understand or to remember any one of the above three control steps or functions can result in the failure of the electric range or of the automatic timer to perform its intended function. Furthermore, with some prior range timers the housewife must remember a fourth step of placing the range timer switch under automatic cyclical control after she has made the preselected time setting or settings.

Considerable difficulty has been heretofore experienced with prior constructions of range timers, due to the inability of the housewife to understand these three or more control steps, or to remember all of these control steps, particularly if a substantial lapse of time has intervened between successive uses of the range timer. Failure to set the cooking controls properly can result in no cooking at all, or in an over-cooked or burned meal. Failure to place the range timer on its "Manual" setting will render the heating circuit inoperative so that it does not respond to the closing and opening of the manual switch. This latter condition leaves the oven totally inoperative to do any cooking, which the housewife construes as indicating a defective switch, or as a burned out heating element; which mistake on the part of the housewife is the source of a large number of "Service" calls made to public utility companies and to electric range distributors. The foregoing difficulties with control settings are not confined to housewives alone, but are also prevalent in the case of salesmen, particularly those who sell different makes of ranges and range timers.

Accordingly, a conventional practice heretofore has been to supply an instruction booklet with each electric range equipped with an automatic timer, which instruction booklet must be frequently referred to, and which almost invariably becomes lost in time.

The fundamental object of the present invention is to provide an improved range timer which is easier to set than any of the range timers that have heretofore been on the market. This range timer is self-explanatory in its operation, in the sense that every step is clearly described or indicated on the timer. No instruction book is necessary.

Another very important object of the invention is to have the oven timer completely separated from the electric clock (although driven thereby), so that the timer can be set without reference to the clock, thereby eliminating confusion. The "Stop Time" setting is established by the manipulation of one control knob which is individual to stop-time settings, and the predetermined setting is indicated by the successive numbers on a rotating dial which appear at a stop-time sight window individual to stop-time settings. The "Hours to Cook" setting is established by the manipulation of another control knob which is individual to cooking-hours settings, and the selected setting is indicated by the successive numbers on another rotating dial appearing at an hours to cook sight window.

Another related object of the invention is to provide an improved "Stop Time" control characterized by a control knob or shaft which has three different control motions for performing three different control functions, these three control motions being, first, an outward pulling motion, second, a rotary motion, and, third, an inward pushing motion. Three different sets of indicia are adapted to appear in the stop-time sight window, to wit: first, the target legend or word "Manual" indicating that the range timer is in "Manual" or closed circuit condition for enabling the range to be controlled by the manual switch; second, the numbers on the stop-time indicating dial which indicate the stop-time setting which is to be given the timer; and, third, the target legend or phrase "Push to Manual." Normally, the range timer stands with the legend "Manual" appearing in the stop-time sight window, indicating that the oven is then subject to the control of the manual switch. The first movement of the stop-time knob, i.e. the outward pulling movement— swings this target legend out of the sight window and exposes the numbers on the stop-time indicating dial.

The number which is thus exposed at the stop-time sight window corresponds to the stop-time setting which the range timer had in the previous use of the timer. If this time agrees with the stop-time setting which the housewife desires for the present cooking operation, she does not rotate the stop-time shaft but leaves it in its previously rotated position after pulling it outwardly. This is an important and convenient feature of the timer, particularly for those families that eat regularly at approximately the same hour every evening.

However, if the previous stop-time setting does not agree with the stop-time setting that the housewife now desires, she performs the second movement of the stop-time knob. This second movement of the stop-time knob—i.e. the rotary movement—rotates the stop-time indicating dial until the member designating the desired or preselected stop-cooking time appears in the center of this stop-time sight window.

Following the completion of the cooking operation at this preselected stop-cooking time, the target legend "Push to Manual" is caused to automatically appear in this sight window. The third and final movement of the control knob—i.e. the inward pushing motion—is thereafter effected to restore the range timer in its normal closed circuit condition with the legend "Manual" appearing in this sight window.

Another object of the invention is to provide an improved "Hours to Cook" control characterized by a control knob or shaft which has two different control motions for performing two different control functions; these control motions being, first, an outward pulling motion, and, second, a rotary motion. The "Hours to Cook" sight window associated with this latter control knob normally has a blank target area presented therein. When the first mentioned stop-time control knob is pulled outwardly for starting the range timer into operation, this outward motion of said first control knob automatically causes a red colored target area to be swung into view in this second sight window, thereby indicating that the heating circuit of the range or oven is then closed. This red target indication provides for that situation wherein the housewife desires to have the cooking operation start immediately, but to have it stop at a preselected time, which preselected time she then proceeds to set up by rotating the stop-time control knob to present the preselected stop-time in the first sight window. Assume, on the other hand, that she desires to have the cooking operation start at a later time and to continue for a predetermined number of hours, she then pulls outwardly on this second or cooking hours knob in the performance of the first control motion thereon. This automatically swings the red target area out of the second sight window and exposes in this window the "Hours to Cook" indicating dial. The number which is then exposed at this second or cooking hours window corresponds to the cooking hours setting which the range timer had in the previous use of the timer. If this time agrees with the cooking hours setting which the housewife desires for the present cooking operation, she does not rotate the cooking hours shaft but leaves it in its previously rotated position after pulling it outwardly.

However, if the previous cooking hours setting does not agree with the cooking hours setting which she now desires she performs the second operation on the cooking hours knob. That is to say, she now rotates this second knob so as to rotate the cooking hours indicating dial for presenting at this second sight window the number corresponding to the number of hours that she wishes to have the cooking operation continue. This thereupon concludes the setting of the range timer, following which the cooking operation starts automatically at a time commensurate with the hours-to-cook setting, and stops automatically at the stop-time setting.

Another object of the invention is to provide such a range timer which does not require that the timer switch be "Set" or placed under automatic cyclical control, as a separately performed manual step, after the time settings have been established.

Another object of the invention is to provide an improved system of interlocking relations between the two control knobs. One of these interlocking relations requires that the first setting operation be performed on the first control knob before any time-setting operation can be performed on the second control knob. Thus, this interlocking relation requires that the range timer be given a stop-time setting before it can be given any hours-to-cook setting.

Another interlocking relation is to compel the cooking hours tripping dial to follow all setting adjustments given to the stop time tripping dial.

Another interlocking relation is provided so as to prevent any change in the stop-time setting of the first control knob after the second control knob has been pulled outwardly for establishing an hours-to-cook setting.

Another interlocking relation is provided to prevent any attempted restoration of the second knob back to its inward or retracted position, after this second knob has been pulled outwardly for establishing an hours-to-cook setting. The only way that the housewife can restore this second knob to its inner retracted position is to first push inwardly on the first control knob for restoring the entire timer back to its normal "Manual" position, and to then start over again in establishing the setting or settings in the timer.

Another object of the invention is to provide an improved construction of interval timer for enabling the housewife to measure relatively short intervals of time, up to approximately one hour; upon the expiration of which set interval an audible alarm is sounded.

Other objects, features and advantages of the invention will be apparent from the following detail description of one preferred embodiment thereof.

In the accompanying drawings illustrating such embodiment:

FIGURE 1 is a front elevational view of the range timer;

FIGURE 2 is a rear elevational view thereof;

FIGURE 3 is a top plan or edge view looking downwardly on the range timer;

FIGURES 4, 5, 6 and 7 are fragmentary elevational views of the sight window portion of the face plate, showing different sequences of indicia appearing in the stop-time sight window and in the hours-to-cook sight window;

FIGURE 8 is the front portion of an exploded perspective view showing most of the parts of our range timer;

FIGURE 9 is the rear portion of this exploded perspective view;

FIGURE 10 is a fragmentary sectional view on a larger scale taken just behind the face plate and showing the clock gear train, interval timer gearing, etc.

FIGURE 11 is a fragmentary transverse sectional view taken approximately on the plane of the line 11—11 of FIGURE 10;

FIGURE 12 is an enlarged detail sectional view showing the laterally tiltable pinion which is operable to drive the mutilated gear of the interval timer;

FIGURE 13 is a fragmentary sectional view showing the operation of the vibrator controlling lever of the interval timer.

FIGURE 14 shows the operating relation between the vibrator and the vibrator and controlling lever;

FIGURE 15 is a fragmentary side view of the vibrator;

FIGURE 16 is a horizontal transverse sectional view approximately on the planes of the lines 16—16 of FIGURES 1, 2 and 41 and illustrating the dial assembly of the range timer on a considerably enlarged scale.

Figure 42:
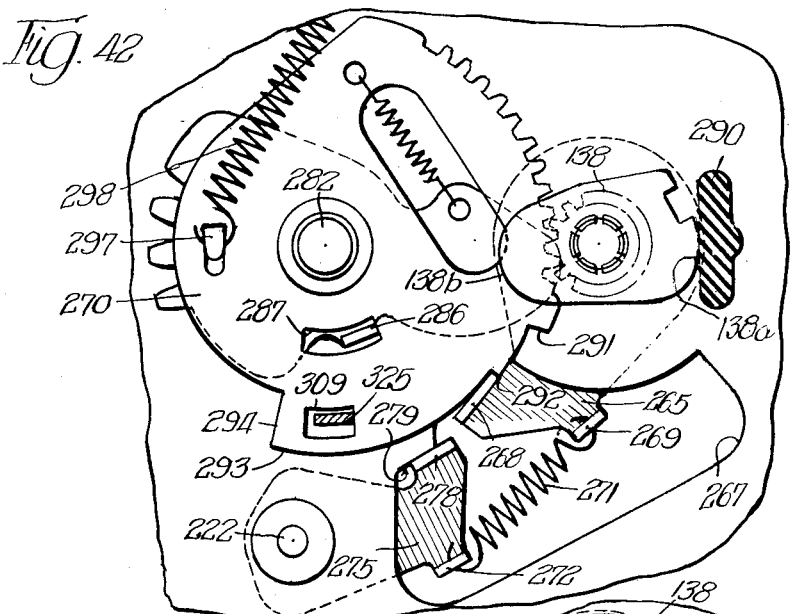

FIGURE 17 corresponds to a view taken on the plane of the line 17—17 of FIGURE 16 showing the shutter dial which rotates directly in back of the sight windows in the face plate and which carries printed and colored indicia for presentation in these sight windows.

FIGURE 18 is an edge view of this shutter dial;

FIGURE 19 is an enlarged detail sectional view taken on the plane of the line 19—19 of FIGURE 17.

FIGURE 20 is a detail elevational view of a spring retaining ring, corresponding to a view taken on the plane of the line 20—20 of FIGURE 16.

FIGURE 21 is an edge view of this spring retaining ring.

FIGURE 22 is a front elevational view of the stop-time dial carrying the stop-time clock numerals thereon, corresponding to a view taken on the plane of the line 22—22 of FIGURE 16.

FIGURE 23 is a transverse sectional view taken on the plane of the line 23—23 of FIGURE 22.

FIGURE 24 is a fragmentary detail sectional view taken approximately on the plane of the line 24—24 of FIGURE 22.

FIGURE 25 is a front elevational view of the hours-to-cook dial showing the cooking hours clock numerals on the face thereof, corresponding to a view on the section plane 25—25 of FIGURE 16.

FIGURE 26 is an enlarged detail sectional view taken on the plane of the line 26—26 of FIGURE 25.

FIGURE 27 is a fragmentary front elevational view of the stop-time tripping dial or disk which carries the stop-time tripping lug, this figure corresponding to a view taken on the plane of the line 27—27 of FIGURE 16.

FIGURE 28 is an edge elevational view of this stop-time disk.

FIGURE 29 is a transverse sectional view taken on the plane of the line 29—29 of FIGURE 27.

FIGURE 30 is a front elevational view of a spring type of spacing washer, viewed on the plane of the line 30—30 of FIGURE 16.

FIGURE 31 is an edge elevational view of this washer.

FIGURE 32 is a front elevational view of the hours-to-cook dial or disk which carries the hours to cook tripping lug, corresponding to a view taken on the plane of the line 32—32 of FIGURE 16.

FIGURE 33 is a transverse sectional view taken on the plane of the line 33—33 of FIGURE 32.

FIGURE 34 is a front elevational view of the time driven tripping or release gear assembly, corresponding to a view taken approximately on the plane of the line 34—34 of FIGURE 16.

FIGURE 35 is a similar view showing the mechanism in the act of being tripped by the stop-time tripping lug.

FIGURE 36 is a detail sectional view taken approximately on the plane of the line 36—36 of FIGURE 35.

FIGURE 37 is a fragmentary elevational view of the tripping or sun gear and to the automatically and manually actuated tripping arms, corresponding to a view taken on the plane of the line 37—37 of FIGURE 16.

FIGURE 38 is a detail elevational view of the operating gear.

FIGURE 39 is a similar view of the cam gear.

FIGURE 40 is a fragmentary elevational view showing the interaction between the tripping arms of FIGURE 37 and the operating gear and cam gear of FIGURES 38 and 39, corresponding to a view taken on the plane of the line 40—40 of FIGURE 16.

FIGURES 41 to 44 inclusive are fragmentary elevational views showing different stages in the operating cycle of the two tripping arms and the operating gear and cam gear.

FIGURE 45 is a transverse sectional view through the stop-time setting shaft, taken approximately on the plane of the line 45—45 of FIGURE 40.

FIGURE 46 is a transverse sectional view through the cooking hours setting shaft, taken approximately on the plane of the line 46—46 of FIGURE 40.

FIGURE 47 is an edge view of the interlocking pawls, corresponding to a section taken on the plane of the line 47—47 of FIGURE 48.

FIGURES 48 and 49 are detail sectional views taken on the planes of the section lines 48—48 and 49—49 of FIGURE 47.

FIGURE 50 is a sectional view corresponding to FIGURE 46, but showing the shiftable double gear in its forwardly shifted position.

FIGURES 51 and 52 are detail sectional views taken on the planes of the section lines 51—51 and 52—52 of FIGURE 50.

FIGURE 53 is a longitudinal sectional through the electrical switch.

FIGURE 54 is a fragmentary elevational view of the inner or under side of one embodiment of switch.

FIGURE 55 is a fragmentary transverse section taken on the plane of the section line 55—55 of FIGURE 54.

FIGURE 56 is an elevational view of the back side of the contact actuator and movable contacts.

FIGURE 57 is a view similar to FIGURE 54 but showing a modified construction of switch, and FIGURE 58 is a fragmentary transverse section taken on the plane of the line 58—58 of FIGURE 57.

Referring first to FIGURES 1, 2 and 3:

The timer comprises a rectangular face plate 10 having a clock dial 11 marked on its left hand side, and having the range timer setting knobs and sight windows arranged at its right hand side. The front of this face plate 10 is covered with a rectangular cover glass 14 which is shown as having its edges enclosed in a bezel frame 15. In some instances the range manufacturer will mount the range timer assembly directly in the rear splash panel or other standard part of the range, which will then define the marginal bezel. However, in the embodiment disclosed, the back side of this bezel has tapped sockets which receive mounting screws 16 (FIGURE 2) which extend forwardly from the back side of the face plate 10. Rotating concentrically of the clock dial 11 are the hour and minute hands 18 and 19, and arranged concentrically within the clock dial numerals is a ring of interval timer numerals 21 over which sweeps an interval timer pointer 22. This interval timer pointer 22 is adapted to be set through the manipulation of an interval timer setting knob 23 which is mounted on a setting shaft 24 which extends back through the cover glass and through the face plate 10 concentrically of the clock hands 18, 19. The setting of the clock hands is effected through a "Clock Set" knob 25 mounted on a setting shaft 26 extending back through the cover glass and face plate 10.

Referring now to the time selecting setting knobs and sight windows of the "Oven Timer" at the right hand side of the face plate 10 in FIGURE 1, the first setting knob to be operated in the setting of the timer is the stop-time knob 28 mounted on the end of a shaft 29 which is capable of rotary motion and also of push and pull reciprocatory motion. Marked on the face plate above this knob is the designating legend "1st Set·Stop Time"

to signify that this stop-time setting is the first operation to be performed on the timer. Directly below this stop-time knob 28 is the directional legend "Pull-Turn," signifying that this stop-time knob 28 is operated by first pulling it outwardly and then turning it. Positioned in the face plate 10 directly to the left of this stop-time knob and shaft 28, 29 is the stop-time sight window 35 having the upper center positioning arrowhead 36. FIGURE 1 shows the oven timer in its normal condition, at which time the legend "Manual" appears in the sight window 35. As will be later described, this legend "Manual" is marked on the target or shutter dial which rotates behind the sight window 35, and also marked on this dial are other legends which appear in the sight window 35 at later steps in the operating cycle of the timer.

Below the stop-time setting knob 28 is an "Hours to Cook" setting knob 38 which is also mounted on a reciprocable and rotatable shaft 39. Above this second knob 38 is the designating legend "2nd Set·Hours to Cook"

signifying that this latter knob 38 is the second one to be set—after the stop-time knob 28 has first been given its setting. Below the second knob 38 is the directional legend "Pull-Turn," signifying that this second knob 38 is first pulled outwardly and then turned in the setting thereof. Positioned in the face plate 10 to the left of the hours to cook knob 38 is the hours to cook sight window 45 having a centering arrowhead 46 at its upper margin. In the normal condition of the oven timer shown in FIGURE 1, a blank target area appears behind this second sight window 45. However, as will now be described in connection with FIGURES 4, 5, 6 and 7, a red target area, cooking hours numerals, and an oven-off legend are adapted to successively appear in this second sight window 45 at successive stages in the operating cycle.

FIGURE 4 shows the first setting or operating stage in the setting cycle, resulting from the housewife performing the first step of pulling outwardly on the stop-time knob 28. The legend "Manual" disappears from the first sight window 35, and in its place appears the successive numbers on the rotatable stop-time dial 155. These numerals extend from 1 to 12 to correspond to any hour of the day or night, and the housewife can select any stop-time numeral by appropriately rotating the stop-time knob 28. It will be assumed that she wishes the meal or dish to be cooked by 6:00 o'clock, and hence she rotates the stop-time dial 155 until the numeral 6 appears directly below the centering arrow 36. At the same time that the housewife pulled the stop-time knob 28 outwardly in the first operation of the setting sequence, the blank target area swung away from in back of the second sight window 45, and a red target area 49 appeared in its place. This red target area 49 signifies that the oven is now turned on, and that if the housewife does nothing further the cooking operation will start immediately and will continue until the stop-time denoted in the first sight window 35 has elapsed, which stop-time we have assumed to be 6:00 o'clock. The setting which has been thus far established provides for that situation where the housewife desires to have the cooking operation start immediately and to finish at a preselected time.

However, in the event that the cooking operation will be completed in a lesser number of hours, so that it should not start immediately but instead should start at a later time, then the housewife pulls outwardly on hours-to-cook knob 38 for establishing a cooking hours setting. This outward pull on the second knob 38 swings the red target area 49 out from behind the second sight window 45, and presents in this second sight window a numbered hours to cook setting dial 160. She then turns the knob 38 to present in the sight window the appropriate number corresponding to the number of hours that the cooking operation is to continue, which, we shall assume to be 2 hours, as indicated in FIGURE 5. This concludes the stop-time setting and the hours to cook setting of the oven timer, following which the cooking operation starts automatically at a time commensurate with the hours to cook setting, and stops automatically at the stop-time setting.

As soon as the cooking operation starts automatically at the time commensurate with the cooking hours setting, the red target area 49 swings back into the lower sight window 45, as shown in FIGURE 6. This establishes an indication to the housewife that the oven is now turned on and that the cooking operation is proceeding.

When the cooking operation is completed at the preselected stop-time, the indications in both the upper and lower sight windows 35 and 45 change to those indicated in FIGURE 7.

Swinging into the lower sight window 45 is the printed legend "Oven Off," and swinging into the upper sight window 35 is the printed legend "Push to Manual." This shows the housewife that the cooking operation is now completed, and that she should push inwardly on the stop-time knob 28 in order to place the oven timer back in its normal "Manual" condition. As soon as she pushes inwardly on the stop-time knob 28 the "Manual" legend appears in the upper sight window 35 and the blank target area appears in the lower sight window 45, as shown in FIGURE 1, representing the completion of an entire cycle of the range timer operation.

Referring now to the details of construction of the unit, it will be seen from FIGURE 3 that a base plate 55 is spaced rearwardly from the face plate 10 by intervening spacing posts 56, having anchoring clips 56' at their rear ends, this base plate 55 being of rectangular form (FIGURE 2) and having forwardly bent side flanges 55' along its upper and lower margins. Mounted by screws 59 on the back side of this base plate 55 is the synchronous electric motor 57 which drives the clock movement, and also the circuit controlling electric switch 58 which responds to oven timer operation. Referring first to the electric clock movement, it will be seen from FIGURES 2 and 11 that the electric motor 57 has a gear reduction housing 61 from which extends an output shaft 62 having a relatively slow rate of rotation. This output shaft 62 extends forwardly through the base plate 55 and mounts pinions 64 and 65 thereon which mesh with the interval timer gear and with the clock movement gearing, all located between the face plate 10 and the base plate 55. Meshing with the pinion 65 is a minute hand gear 66 which is mounted on the minute hand arbor sleeve 67 that extends forwardly through the face plate 10 and carries the minute hand 19 on its front end. The rear end of the minute hand arbor sleeve 67 is formed integrally with a minute hand pinion 68. A friction slippage clutch 69 is provided between the minute hand gear 66 and the arbor sleeve 67 so that the manual operation of setting the clock hands through the setting knob 25 will not drive back through the synchronous motor output shaft 62. These friction slippage clutches in such situations are old and well known.

The minute hand pinion 68 meshes with a relatively large hour hand reduction gear 73 which is mounted on an arbor 74 anchored in the base plate 55. Rotating with the large reduction gear 73 is a pinion 75 which meshes with an hour hand gear 76 which in turn is secured to an hour hand arbor sleeve 77 which revolves concentrically over the minute hand arbor sleeve 67, and which carries the hour hand 18 at its front end. This speed reducing gear train 66—76 establishes the necessary speed reduction between the minute and hour hands. Interposed between the hour hand gear 76 and the face plate 10, and surrounding the hour hand arbor sleeve 77 is a plate 79 having a step bearing 81 in its outer end. This step bearing receives a lower bearing boss 82 projecting downwardly from the lower motor driven pinion 65 (FIG. 12), whereby to establish a spaced point of bearing support for the motor output shaft 62.

*Interval Timer Mechanism*

Extending axially through the minute hand and hour hand arbor sleeves in the aforementioned interval timer shaft 24 which carries the interval timer setting knob 23 on its front end. The rear end of this timer shaft 24 is journaled in the base plate 55, and mounted on this timer shaft in front of said base are a cam wheel 84 and a sector or mutilated type of spur gear 85. This latter spur gear 85 is formed with a toothless idling notch or sector 86 (FIGURE 13) at one point in its periphery. This notched spur gear is adapted to mesh with the laterally tiltable driving pinion 64 mounted on the motor output shaft 62. As shown in FIGURE 12, the laterally tiltable pinion 64 comprises a hollow shank portion 88 from which the pinion teeth radiate; and the front end of this hollow shank portion slopes inwardly to form an end or base flange 89 having rounded outer edges. This base flange seats in a flat bottom socket 91 formed in the adjoining end face of the other drive pinion 65 which is fixedly secured to motor output shaft 62. A compression spring 92 surrounding the shaft 62 presses the base flange 89 down against the flat bottom of the socket 91 and establishes a frictional driving relation between the positively driven pinion 65 and the tiltable pinion 64. As shown in dotted lines in FIGURE 12, the pinion 64 can tilt laterally away from the notched gear 85 when the toothless notch 86 is rotated past the tiltable pinion 64 to bring the toothed periphery 87 into mesh with the teeth on the pinion 64. When the interval timer is in its normal off condition with the interval timer pointer 22 registering with the "Off" marking of the interval timer scale 21, the toothless notch 86 lies in registration with the tiltable pinion 64. Also, when the interval timer pointer 22 is registering with the "0" marking on the interval timer scale 21, the beginning of the toothless notch 86 lies in registration with pinion 64. When the housewife turns the timer setting knob 23 to bring the timer pointer 22 into registry with a preselected time marked on the interval timer scale 21, the notched gear 85 is rotated through a corresponding angular distance relatively to the tiltable pinion 64. If the teeth 87 of the notched gear do not initially register with the tooth spaces of the pinion 64, this pinion is then tilted laterally until correct tooth registration is effected, whereupon the pinion 64 snaps back into its normal driving position in alignment with the motor output shaft 62. The friction slippage relation between the pinions 64 and 65 permits free rotation of the pinion 64 in this operation of manually setting the interval timer at the desired timing interval, but this friction slippage connection transmits adequate torque to thereafter drive the notched spur gear 85 through its return rotation back to its off position.

Referring now to the cam wheel 84, it will be seen from FIGURE 13 that the major portion of its periphery 95 is of a constant radius, but that at one point in this periphery there are provided two notches 96 and 97. The first notch 96 has its bottom surface at substantially the same radius as the main peripheral portion 95, this first notch being formed between two closely spaced humps 98 and 99. The second notch 97 extends inwardly into the body of the cam wheel to a depth substantially below or inwardly of the main peripheral portion 95. Bearing on this cam wheel is a pin 101 mounted in one arm of a bell crank lever 102 which controls the vibrator of the interval timer. This bell crank lever 102 is pivotally mounted on the front side of the base plate 15 on a pivot stud 103; and the other arm of said lever is provided with a rearwardly bent lug 104 which extends outwardly through a clearance opening 105 in the base plate. At the back or rear side of the base plate 55 this lug 104 is arranged to be moved into and out of engagement with a vibrator 106 which is in the form of a metallic reed or spring arm that responds magnetically to the alternating current electromagnetic field generated in the stator of the synchronous motor 57. As shown in FIGURES 14 and 15, the vibratory reed 106 has an attaching flange 108 at one end which is secured to the back of the base plate 15 by screws 109. From this attaching flange the reed slopes outwardly and downwardly to a head portion 111 in which is anchored a laterally projecting hammer or armature 112. This hammer element 112 enters a slot 114 in the side wall of cup-shaped motor housing 115, where the hammer element is in position to respond to the alternating current electromagnetic field generated in the stator of the electric motor. Projecting from the vibratory head portion 111 is an L-shaped arm 116 which extends into a position adjacent to the lug 104 on bell crank lever 102.

If desired, a sheet metal guard 117 may be provided to overlie the vibratory reed, this guard being secured at one end to the base plate 55 by an attaching ear 118 and screw 119, and having at its other end a lug 120 projecting into an aperture in the base plate.

When the pin 101 is reposing in the first notch 96, in the normal non-operating condition of the interval timer, the bell crank lever 102 occupies the position shown in full lines in FIGURE 13, at which time the lug 104 is held pressed laterally against the L-shaped arm 116, whereby the hammer head 112 of the vibratory reed is pressed inwardly into a non-vibratory position in the electric motor. In the setting of the interval timer the knob 23 is manually rotated in a counter-clockwise direction to bring the interval timer pointer 22 into registration with the selected marking on the interval timer scale 21, thereby resulting in a similar counter-clockwise rotation of the cam wheel 84 and notched gear 85. This brings the toothed portion 87 of the notched gear into mesh with the pinion 64, following which the continued rotation of the pinion starts driving the notched gear 84 back in a clockwise direction toward the sounding position of the interval timer. This sounding position is arrived at when the pointer 22 arrives at the "0" position on the scale 21, at which time the relatively deep notch 97 comes under the pin 101, thereby permitting the bell crank lever 102 to swing into the dotted line position shown in FIGURE 13. This retracts the lever lug 104 out of pressure engagement against the L-shaped arm 116 of the vibratory reed, whereby the reed is permitted to vibrate so as to audibly indicate the expiration of the selected interval time. At the same time, the toothless gap 86 permits the pinion 64 to rotate idly, whereby the buzzer reed will continue to sound continuously until the housewife shuts it off. This she does by rotating the interval timer shaft in a clockwise direction so as to bring the pointer 22 into the "Off" position, which rotation forces the first notch 96 under the pin 101 for swinging the bell crank lever 102 back into its full line non-sounding position. In this "Off" condition of the interval timer, the toothless gap 86 in the notched spur wheel 85 is still in a position to permit the pinion 64 to rotate idly without transmitting rotation to the spur wheel 85.

Referring now to the "Clock Set" knob 25 and shaft 26, the rear end of said shaft has bearing mounting in the rear base plate 55, and secured to said shaft directly against the front side of this base plate is a pinion 121. This pinion meshes with a narrow face spur gear 124 which is also positioned substantially against the back plate 55, and which rotates on a pivot stud 125 anchored in the frame plate 55. This narrow face spur gear 124 meshes with a wide face spur pinion 126 which is rotatably mounted on a pivot stud 127 anchored in the base plate 55. This wide face spur pinion 126 meshes with the relatively large hour hand reduction gear 73, from which it will be seen that rotation of the clock set knob 25 operates to set the clock hands 18 and 19 through the above described gear train.

The motor driven clock movement, of course, transmits a time driven rotation back through gears 73 and 126 to the narrow face spur gear 124. Formed integral with and projecting forwardly from this spur gear 124 is a spur pinion 129 which constitutes the gear that transmits time driven rotation to the time driven disk of the oven timer assembly, which will now be described.

*Oven Timer Mechanism*

The presentation of the different indicia at the sight windows 35, 45 (FIGURES 4–7), together with the stop-time setting and the hours-to-cook setting, are all effected by a coaxially aligned series of large diameter dials which are mounted at the right hand side of the unit between the face plate 10 and the back plate 55. These dials are shown in enlarged transverse section in FIGURE 16, and are also shown in front elevation in FIGURES 17, 22, 25, 27, 32, 34, etc., corresponding to views taken on the similarly numbered section planes of FIGURE 16. Extending coaxially of this series of dials is a stationary central arbor sleeve 135 (FIGURE 16) which has staked mounting at its rear end in the back frame plate 55 and which extends forwardly therefrom toward the face plate 10. Extending axially through this stationary arbor sleeve 135 is a rotatable shaft 136 which projects rearwardly beyond the back plate 55 and carries a driving pinion 137 and a switch operating cam 138 at its rear end. Mounted on the front end of this central shaft 136, just beyond the front end of the stationary arbor sleeve 135, is the shutter or target dial 140 which presents the different legends and colored indicia at the sight windows 35 and 45. All of the other dials in the coaxial series are rotatably supported on the exterior of the stationary arbor sleeve 135.

Referring now to FIGURES 17–19 showing this shutter or target dial 140 in detail, in FIGURE 17 the sight windows 35 and 45 are indicated in dotted lines to show their radial relation with respect to this dial. It will be seen that the upper stop-time sight window 35 registers with the inner radial zone of the dial, and that the lower hours-to-cook sight window 45 registers with the outer radial zone of the dial. Located in the inner radial zone for presentation at the upper sight window are the legends "Manual" and "Push to Manual." Also located in this inner radial zone is an arcuate slot or window 143 which is cut out in the dial 140 in order to expose at the upper sight window a stop-time hours scale which is printed on a stop-time dial located in rear of the target dial 140. The outer radial zone of this target dial 140 carries a blank or white colored area 144 which normally registers with the lower sight window 45 (FIGURE 1). Also provided in this outer radial zone is indicium 49 which, on presentation in the lower sight window 45, indicates that the oven is turned on and is cooking. The indicium 49 preferably consists of a red colored segment, but it will be understood that it might also consist of any other appropriate color, or a suitable printed legend designating that the oven is on. Spaced clockwise from this red segment 49 is an arcuate notch or window 146 cut out of the periphery of the dial 140, which notch is adapted to expose at the lower sight window 45 a numbered hours-to-cook scale which is printed on still another dial behind the target dial 140 (FIGURE 5). Also located in this outer radial zone is the printed legend "Oven Off" which is adapted to be presented in the lower sight window 45 when the cooking operation is completed (FIGURE 7). As shown in FIGURE 19, the apertured central portion of this target dial 140 is provided with rearwardly projecting slotted ears 148 which are adapted to receive diametrically opposite driving lugs 149 projecting from the front end of the central shaft 136. The dial 140 is held against outward displacement from the end of the shaft 136 by the head of a retaining screw 139 which threads into a tapped bore in the outer end of the shaft 136.

In FIGURES 20 and 21 we have illustrated a spring retaining ring 151 which snaps into an annular groove 152 formed in the arbor sleeve 135. This retaining ring holds against outward or forward endwise displacement the successive disks which have journaled bearing on the outer bearing surface of the arbor sleeve 135.

FIGURES 22, 23 and 24 illustrate the stop-time indicating dial 155 which has the stop-time clock numerals thereon that are presented in the upper stop-time sight window 35, this sight window being shown in dotted lines in FIGURE 22. This stop-time indicating dial 155 is, of course, only viewable through this stationary sight window 35 when the rotatable arcuate window 143 of the shutter dial 140 is in registration with this front sight window 35 (FIGURE 4). It will be noted that the numerals on this dial 155 progress counter-clockwise. As shown in FIGURES 23 and 24, this stop-time indicating dial is formed at its center with a rearwardly offset bridge portion 156 having a bearing aperture 157 in its center which has journal mounting on the arbor sleeve 135. Punched out of the arms of this bridge portion are diametrically opposite slots 158 which receive driving or keying lugs projecting forwardly from a rearwardly disposed stop-time tripper dial, to be presently described. Coextenisve with the outer ends of the bridge portion 156, the dial is formed with rearwardly projecting bearing lips or flanges 159 on which the hours-to-cook indicating dial has rotatable mounting, which latter dial will now be described.

FIGURES 25 and 26 illustrate the hours-to-cook indicating dial 160 which is disposed directly in rear of the stop-time indicating dial 155, and is rotatably mounted on the rearwardly projecting bearing lips 159 thereof. This cooking hours indicating dial 160 has a scale 161 numbered from 0 to 5½ hours, which numbers progress clockwise, with the angular span between the "0" and the "5" extending substantially 150°. This numbered scale lies at a greater radius than the periphery of the stop-time indicating dial 155 and therefore is not obscured by the latter dial. Said cooking hours scale 161 is presented at the lower cooking hours sight window 45 when the peripheral notch 146 in the edge of the shutter dial 140 is also in registration with this lower sight window 45. As shown in FIGURES 16 and 26, the central portion of the cooking hours indicating dial 160 is cupped rearwardly at 162 to form a circular depression in which the stop-time dial 155 is disposed. This circular depression 162 has a relatively large central bearing opening 163 therein that has bearing mounting on the rearwardly projecting bearing lips 159 of the stop-time indicating dial 155.

Formed around the periphery of this cooking hours indicating dial 160 are gear teeth 166 with which a spur pinion 221 (FIGURE 25) remains in constant mesh, this pinion 221 being rotatably mounted on a pivot stud 222 which has staked mounting in the back plate 55. The pinion 221 normally remains stationary but is adapted to be coupled to the cooking hours shaft 39 when this shaft is pulled outwardly, such coupling being effected by a shiftable pinion on the cooking hours shaft 39 which is slid into engagement with the pinion 221 when the shaft is pulled outwardly, as will be later described in detail.

FIGURES 27, 28 and 29 illustrate the stop-time tripping dial 170 which is mounted directly in rear of the cooking hours indicating dial 160. Punched out of the central portion of this stop-time tripping dial 170 are two diametrically opposite forwardly projecting lugs 172 which extend through the large central opening 163 in the cooking hours indicating dial 160 and which enter the diametrically opposite slots 158 in the stop-time indicating dial 155, thereby permanently coupling the stop-time indicating dial 155 and the stop-time tripping dial 170 together for conjoint rotation. Punched out of the outer portion of the stop-time tripping dial 170 is a rearwardly bent stop-time tripping lug 173, which is adapted to effect the stop-time tripping at the setting given the dials 155 and 170, as will be later described. Around the periphery of this stop-time tripping dial 170 are gear teeth 174 and meshing with these gear teeth at the upper right hand side of the dial is a pinion 211. The pinion 211 is journaled on a fixed pivot stud 212 which has staked mounting in the back frame plate 55. Meshing with the pinion 211 is a wide faced gear 214 which is mounted on the stop-time setting shaft 29 between the face plate 10 and frame plate 55. The pivot stud or bushing 212 has a flat spot 212′ milled out on one side. Mounted on said stud above and below the pinion 211 are non-circular guide washers 215 which have openings which are flat on one side to match with the flat spot 212′; whereby these washers are held against rotation. The circular portions of these washers lie directly above and below the pinion 211 to prevent this pinion from accidentally engaging with dial gears above or below the dial gear 170. The notched out sectors 215′ in the washers 215 accommodate the teeth of the wide faced gear 214. Formed in the bore of the wide faced gear 214 are diametrically opposite keyways 216 in which slide keys 217 carried by the shaft 29 (FIG. 45), which permit reciprocation of the shaft while compelling the gear 214 to rotate with the shaft 29 at all times. The permanently meshing relation between the dial gear teeth 174 and the pinion gear teeth 211 results in the stop-time tripping dial 170 being permanently rotatively connected with the stop-time setting knob 28. Meshing with the peripheral gear teeth 174 at the lower right hand side of the dial 170 is a pinion 225, which is rotatably mounted on fixed stud 222. Mounted on the cooking hours shaft 39 and arranged for sliding movement into and out of mesh with the pinion 225 is a pinion 228 which constitutes the forward section of a compound slidable gear 227 having a relatively wide rear section 229 (FIGURE 46). Formed in the bore of this compound gear are keyways 231 in which slide keys 232 carried by the cooking hours shaft 39. The function of the compound slidable gear 227 will be later described in connection with FIGURES 45 and 46. The line of tooth mesh between the stop-time tripping dial 170 and the pinion 225 is shrouded on the front and rear sides of the pinion 225 by spaced front and rear guide washers 235, 235a of substantially the same notched or non-circular pattern as the previously described guide washers 215. The pivot stud 222 has a flat spot 222′, and the openings in the washers 235 have corresponding flat spots, whereby the washers are held against rotation, with their outer notched out sectors 235′ in position to accommodate the teeth of slidable pinion 228.

FIGURES 30 and 31 illustrate a spring type of spacing washer 181 which is mounted on the arbor sleeve 135 directly in rear of the stop-time tripping dial 170 (FIGURE 16). This spacing washer is of the conventional wavy spring type, and is adapted to exert separating end thrust between the stop-time tripping dial 170 and the cooking-hours tripping dial 180 which is immediately in rear thereof.

FIGURES 32 and 33 illustrate this cooking-hours tripping dial 180, from which it will be seen that it has a long arcuate slot 182 therein near its outer periphery. Extending rearwardly through this arcuate slot, and turnable from end to end thereof, is the stop-time tripping lug 173 which projects rearwardly from the stop-time tripping dial 170. Punched to extend rearwardly from the cooking-hours tripping dial 180, at the counter-clockwise end of the arcuate slot 182, is a cooking hours tripping lug 183. The stop time tripping lug 173 that extends through the arcuate slot 182, and the cooking hours tripping lug 183 that is located at one end of said slot, are both disposed at approximately the same radius and both project rearwardly beyond the dial 180 substantially the same distance, so that they are both engaged successively by a rotating switch actuating or tripping lever mounted on a time driven dial 190 which is located immediately in rear of the cooking hours tripping dial 180, as will be presently described. In adjusting the cooking hours setting of the timer, the stop-time tripping lug 173 remains stationary, and the end of the slot 182 containing the cooking hours tripping lug 183 is rotated either toward or away from the stop-time tripping lug 173, depending upon the number of cooking hours to be set up. The angular distance that the arcuate slot 182 can travel before the cooking hours lug 183 at one end of said slot strikes one edge of the then stationary stop-time lug 173 in one direction of travel, and before the opposite end 182′ of said slot strikes the other edge of the stop-time lug 173 in the opposite direction of travel, is substantially equal to the angular span from the 0 marking to the 5½ marking on the scale 161 of cooking hours indicating dial 160. As shown in FIGURE 16, the cooking hours tripping dial 180 has a rearwardly offset peripheral portion 184 in the edge of which are formed the gear teeth 185. This rearwardly offset portion 184 is provided to establish a substantially equal axial spacing between the toothed peripheries of the four dials 160, 170, 180 and 190 (FIGURE 16). Meshing with the peripheral gear teeth 185 of dial 180 is the forward section 238 of a double gear 237 which is rotatably mounted on pinion supporting arbor stud 222. Adapted for slidable meshing engagement with this gear 238, is the aforementioned wide rear gear 229 of the compound shiftable gear on the cooking hours shaft 39, which slides into mesh with the gear 238 when the shaft 39 is pulled outwardly, as will be later described. The rear guide washer 235a shrouds the front side of the line of mesh between dial teeth 185 and gear teeth 238.

It will be seen from FIGURE 16 that the three dials or disks 155, 170 and 180 each have independently rotatable bearing support on the front shank portion 135b of the stationary mounting arbor 135, the dials 155 and 170 being coupled together however by the lugs 172 of the dial 170 entering the slots 158 of the dial 155. The dial 160 has bearing support on the bearing flanges 159 of dial 155.

Referring now to the time driven dial 190 illustrated in FIGURES 34, 35 and 36, this dial has staked mounting in a relatively long bearing hub 191 which is rotatably mounted on an intermediate shank portion 135d of the mounting arbor 135 (FIGURE 16). Formed on the periphery of this time driven dial 190 are gear teeth 192 which mesh with the teeth of time driven pinion 129 (FIGURE 10), which, as previously described, is constantly driven by the synchronous electric motor 57 at a timed rate. This timed rate is transmitted to the time driven dial 190 to cause it to make one complete revolution in a clockwise direction (FIGURE 34) every twelve hours.

Pivotally mounted on this continuously rotating time driven dial 190 is a tripping lever 194 having an outwardly sloping tail portion 195. The cooking hours tripping lug 183 and the stop-time tripping lug 173 both occupy angularly preset positions in the orbit of rotation of the lever tail portion 195 so that as this tail portion successively engages these tripping lugs 183 and 173 in the continuous timed rotation of the time driven dial 190 the tripping lever 194 will be swung in its pivotal mounting on the dial 190 for each engagement against the tripping lugs 183 and 173. Such tripped swinging motion of the tripping lever 194 is made operative through a planetary gear drive to transmit momentary rotative movement to a tripping gear 200 which is rotatably mounted on stationary arbor sleeve 135 directly in back of the time driven gear 190. This planetary gear driving arrangement is substantially the same as is disclosed in prior Patent 2,619,558, granted November 25, 1952, to William P. Gallagher and Carl Weber, to which attention is directed for specific details of this planetary gear arrangement. Briefly described, it comprises a planetary pinion 197 which is pivotally mounted on the back side of time driven dial 190 on a pivot stud 198 anchored in the dial 190 and projecting rearwardly therefrom. This planetary pinion 197 meshes with the toothed periphery 200′ of a tripping gear 200 which is mounted concentrically of the time driven dial 190 but is of smaller diameter. This tripping gear 200 normally stands in a stationary position, and hence in the continuous clockwise rotation of the time driven dial 190 the planetary pinion 197 idly rotates in a clockwise direction about the axis of the pivot stud 198 and with a planetary rotation in a clockwise direction about the axis of the time driven dial 190. Whenever the tripping lever 194 is pivotally tripped by engagement with either of the tripping lugs 183 or 173 this movement of said lever is made operative to momentarily block the planetary rotation of planetary pinion 197 on pivot stud 198 so that a positive drive is momentarily transmitted from the time driven dial 190 to the smaller tripping gear 200. Referring to the construction and operation of this lever 194, a slot 203 in this lever has pivotal mounting on a stud 204 which projects forwardly from the front side of the time driven dial 190. The stud 204 is provided with a front head which overlies the margins of the slot 203. A tension spring 206 has one end connected to the lever 194 at 207 and has its other end connected to the time driven wheel 190 at 208, this tension spring being recessed into a long slot 209 which is punched out in the time driven wheel 190. The action of this tension spring 206 is to hold the lever in the position shown in FIGURE 34 with the inner end of the slot 203 pressed up against the pivot stud 204 and with the nose portion 195 of the lever in position to engage with the first and second stripping stops 183 and 173 as the lever 194 is slowly revolved by the time driven dial 190 into succesive engagement with these tripping lugs.

The other arm of the lever 194 is formed with a relatively wide notch 196 therein, one edge 169′ of which is adapted to function as a guide edge in collaboration with a guide stud 193. This guide stud has its inner end riveted or staked to the time driven dial 190 and extends forwardly into the notch 196 and has a large head portion 193′ which overlies the edges of the notch 196. The straight guide edge 196′ of the notch is adapted to have sliding guided engagement in contact with the shank portion of the guide stud 193. When the nose 195 of the actuating lever 194 encounters one of the settable tripping studs 183 or 173 in the normal forward rotation of the time driven dial and actuating lever, this lever is caused to rock around the pivot stud 204 in a counter-clockwise direction, as shown in FIGURE 35. In this normal counter-clockwise tripped pivoting of the lever 194 the guide surface 196' of the notch 196 separates from the guide stud 193, the notch 196 being sufficiently wide to accommodate the necessary range of pivotal movement of the lever. The purpose of the slot 203 and of the guide surface 196' is to permit a retractive sliding movement of the lever 194 in the event that the tripping end 195 of the lever and one of the tripping lugs 183 or 173 should come together in a reverse direction of rotation. This can arise during the setting operation if one of the tripping lugs 183 or 173 is being rotated in a forward clockwise direction past the tripping end 195 of the lever 194; or it may arise in setting the clock hands of the clock if the clock hands should be rotated backwardly and carry the tripping end 195 of the lever against one of the tripping lugs 183 or 173. In either of these situations, the lever 194 can have a sliding retractive movement along an inward path defined by the slot 203 and guide surface 196', the spring 206 snapping the lever 194 back to its normal position as soon as the tripping pin and the tripping end of the lever have cleared each other. This pin-clearing retractive movement of the lever 194 does not impart switch tripping movement to the tripping gear 200 through the planetary pinion 197.

Referring now to the manner in which the normal counter-clockwise pivoting of the lever 194 imparts tripping movement through the planetary pinion 197 to the tripping gear 200, it will be seen that the other extremity of the lever 194 is formed with an arm 194' which carries a thin leaf spring 199 that is adapted to act as a ratchet pawl or nose for coaction with ratchet teeth around the periphery of a ratchet wheel 201. The anchored end of the leaf spring 199 is welded or riveted to the inner side of a rearwardly projecting flange 202 extending from the arm 216. The ratcheting end of the spring 199 is flexed slightly in an outward direction with its inner side abutting against a stop shoulder 205 formed on the arm 194'. This stop shoulder predetermines the normal position of the ratcheting end of the spring, but as the spring enters the ratchet teeth on the wheel 201 and starts to follow the rotating path of the teeth the spring can flex away from the stop shoulder 205. The ratchet wheel 201 is fixedly secured to the planetary pinion 197 to rotate therewith, and is preferably disposed on the back side of the time driven dial 190. Accordingly, the ratcheting spring 199 is set in a long rectangular recess 210 punched out of the time driven dial 190 so that this ratcheting spring can act on the teeth of the ratchet wheel 201 even though this wheel is mounted on the opposite side of the dial 190 from the lever 194. In order to utilize as much of the effective working stroke of the ratchet spring 199 as possible the ratchet wheel 201 is preferably formed with very fine ratchet teeth, approximately in the order of 100 teeth or more for a wheel diameter of approximately one-half inch.

During the normal non-tripping part of the cycle, the time driven dial 190 slowly rotates at a rate of one revolution in twelve hours, and carries the tripping lever 194 and planetary pinion 197 with it. Since the tripping or sun wheel 200 is normally yieldingly held in a stationary position by a spring biased tripping arm to be hereinafter described, the planetary pinion 197 idly revolves around this sun gear 200, with a concurrent planetary rotation occurring in a clockwise direction around the planetary axis 198. At this time the ratchet spring 199 stands clear of the teeth on the ratchet wheel 201. As soon as the nose 195 of the tripping lever 194 encounters either of the manually set tripping lugs 183 or 173 the lever 194 starts to oscillate in a counter-clockwise direction around the axis of the pivot stud 204. This immediately swings the ratchet spring 199 outwardly into the teeth of the ratchet wheel 201 so that further idling rotation of the ratchet wheel 201 and planetary pinion 197 in a clockwise direction around planetary axis 198 is immediately stopped. The continued counter-clockwise swinging movement of the lever 194 with progressive movement of the nose 195 along the tripping lug 183 (or 173) causes continued outward motion of the ratchet spring 199 and continued counter-clockwise rotation of the ratchet wheel 201 and planetary pinion 197. The blocking of the clockwise rotation of the ratchet wheel and planetary pinion immediately started to impart clockwise movement to the sun gear 200, and the next succeeding action of immediately imparting counter-clockwise rotation to the ratchet wheel and planetary pinion around the planetary axis 198 accelerates this clockwise rotation of the sun gear 200. This accelerated rotation transmitted to the sun gear through the planetary pinion imparts a more rapid tripping movement to the tripping lever actuated by said sun gear. Such accelerated tripping movement is advantageous in obtaining greater accuracy in the tripping operation. The degree of clockwise tripping rotation transmitted to the sun gear 200 through the planetary pinion 197 depends upon the angular span of the manually settable tripping lugs 183 and 173. The cooking hours tripping lug 183 is relatively narrow or of short angular span and hence this lug only causes the sun gear 200 to be actuated through a relatively short distance. On the other hand, the stop cooking tripping lug 173 is relatively wide or of long angular span, and hence this lug is operative to swing the sun gear 200 through a relatively longer angular throw. The purpose of having the tripping sun gear advanced through different degrees of angular throw by the tripping lugs 173 and 183 will be later described.

This oscillatable sun gear 200 is fragmentarily illustrated in FIGURE 37, from which it will be seen that a short radially extending slot 261 is punched out in one side thereof. Projecting forwardly into this slot is a lug 262 which is formed on the hub portion 266 of a tripping arm 265 which is mounted directly in back of the oscillatable sun gear 200. As shown in FIGURE 16, the hub portion 266 of this tripping arm has rotative mounting on the stationary arbor sleeve 135 between the rear end of the enlarged shank portion 135f and the rear frame plate 55. Punched out in the rear frame plate is a relatively long opening 267 having one curved edge concentric with the center of rotation of the tripping arm 265. The swinging end of said arm has two lugs 268 and 269 projecting rearwardly through this opening 267 and terminating slightly beyond the back surface of the rear frame plate 55. The first lug 268 functions as a stop dog adapted to engage with successive stop shoulders on an operating or latching gear 270. The other lug 269 of the tripping arm 265 has a tension spring 271 hooked thereto for normally holding the stop lug 268 pressed inwardly into position to engage the stop shoulders on the operating gear 270. The other end of the tension spring 271 is hooked to a lug 272 projecting from a secondary tripping arm 275. This secondary tripping arm 275 has a hub portion 276 which is pivoted on the gear supporting pivot stud 222, in a plane between the pinion assembly and the front side of the back plate 55. Also projecting from the secondary tripping arm 275 in a direction rearwardly through opening 267 is a stop dog or lug 278 which cooperates with the stop dog lug 268 in effecting latching engagement against the stop shoulders of the operating gear 270. The tension spring 271 normally holds the stop lug 278 pressed upwardly against a stop shoulder 279 defined in one margin of the opening 267. It will be seen from the foregoing that the tension of the spring 271, acting through the tripping arm 265, normally holds the oscillatable sun gear 200 in the position illustrated, and that each time this sun gear is oscillated in a clockwise direction (FIGURE 37) the stop lug 268 will be oscillated downwardly in a clockwise direction to release one of the stop shoulders on the operating gear 270.

Referring now to FIGURES 38–44, these show the operating gear 270 as viewed from the back side of the assembly, this operating gear being disposed on the outer or back side of the rear frame plate 55. Cooperating directly with the operating gear 270, and pivoted concentrically therewith, is a cam gear 280 (FIGURE 39). The operating gear and cam gear have concentric pivot apertures which are rotatably mounted on a pivot stud 282 that has staked anchorage in the back plate 55 and projects rearwardly therefrom. The cam gear 280 lies next to the back plate 55, having spherical protuberances 284 adapted to have sliding contact with the back plate; and the operating gear 270 is superposed over the cam gear 280, this operating gear having similar spherical protuberances 285 for sliding contact with the outer surface of the cam gear 280. Projecting rearwardly from the cam gear 280 is a lug 286 which extends out through an arcuate slot 287 in the operating gear 270. The lug 286 has a limited amount of angular lost motion in the slot 287 so that the operating gear 270 and cam gear 280 are capable of limited lost motion rotation relatively to each other.

Formed in one edge of the operating gear 270 is a gear tooth sector 288 which meshes with the pinion 137 on the central switch operating shaft 136. Rotative movement imparted from gear sector 288 to pinion 137 rotates the switch operating cam 138 which in turn imparts swinging movement through either one of its diametrically opposite cam lobes 138a or 138b to switch operating arm 290, as will be presently described.

Formed in operating gear 270, just beyond one end of the gear sector 288, are two radially extending stop shoulders 291 and 292 followed by a concentric dwell 293. It will be noted that the second stop shoulder 292 is of substantially smaller radial depth than the first stop shoulder 291, which cooperates with the different degrees of angular span of the settable tripping lugs 173 and 183, as will be presently described. Beyond the concentric dwell 293, the operating gear 270 is formed with a large radially extending stop shoulder 294 which normally stands in abutment against a stationary stop lug 295 bent upwardly from the base plate 55. Punched outwardly from the upper portion of the operating gear 270 is a hook lug 297 to which is hooked one end of a tension spring 298, and the other end of this tension spring is hooked to a lug 299 projecting upwardly from the back frame plate 55. This tension spring normally tends to swing the operating gear 270 in a clockwise direction (FIGURE 40), with the stop shoulder 294 held in abutment against the stop lug 295. When the operating gear 270 is revolved counter-clockwise, additional energy is stored in this tension spring 298, and this spring energy rotates the operating gear 270, cam gear 280, pinion 137, cam 138, central shaft 136 and shutter dial 140 through each of the operating steps in the sequence shown from FIGURE 40 to FIGURE 44.

Punched out of the operating gear 270 is a long slot 301 in which is disposed a tension spring 302. One end of this tension spring is connected at 303 to the operating gear 270 and the other end of the tension spring is connected at 304 to the cam gear 280, this spring normally tending to hold the cam gear 280 swung in a counter-clockwise direction, with the lug 286 abutting against the counter-clockwise end of the arcuate slot 287 in operating gear 270.

Formed along the lower edge of cam gear 280 is a sloping or rounded cam edge 305. When the cam gear 280 is revolved in a clockwise direction relatively to the operating gear 270, to swing the lost motion limiting lug 286 back toward the left hand end of arcuate slot 287, this cam edge 305 is operative to force whichever tripping lug 268 or 278 is in engagement with one of the stop shoulders 291 or 292, out of engagement with that stop shoulder, thereby freeing the gear assembly 270—280 for spring impelled rotation back to its normal position, defined by limit shoulder 294 abutting limit stop 295. When the oven timer is in its normal "Manual" position, the operating gear 270 and operating cam 280 occupy the positions shown in FIGURE 40, at which time neither one of the stop lugs 268 or 278 of the latching arms 265 and 275 is in engagement with the stop shoulders 291 and 292. However, as the different rotative movements of the gear combination 270—280 occur in the operating cycle of the timer, these stop lugs 268 and 278 engage with the stop shoulders 291 and 292, as illustrated in FIGURES 41, 42, 43 and 44, to be later described.

Formed in the upper edge of cam gear 280 is a gear sector 308 which is arranged to be rotated in opposite directions by the outward pulling and inward pushing of the stop time shaft 29; and formed in the lower portion of operating gear 270 is a slot or single tooth space 309 which is arranged to be rotated in a counter-clockwise direction by the outward pulling of the cooking hours shaft 39. Referring first to the operation of the gear sector 308, and with particular reference to FIGURE 45, it will be seen that meshing with this gear sector 308 is a right angularly disposed gear sector 311 which is pivotally mounted at 312 on a right angle bracket 314 which is secured by a screw 315 and raised lug 316 to the back surface of the frame plate 55. Directly below and in the plane of the angularly disposed gear sector 311 there is a slot 310 punched out in the base plate 55 so as to permit the teeth of gear sector 311 to move entirely down through the tooth spaces of gear sector 308. Extending from the gear sector 311 is an arm 317 carrying a laterally projecting pin 318. This pin 318 extends into the annular groove of a grooved collar or spool 319 which is secured to the outer rear end of the stop time shaft 29. Forwardly of this grooved collar or spool, the shaft 29 is formed with an annular groove 321 in which engages a spring washer 322, this washer being adapted to limit the outward pulling motion of the shaft 29 by striking the back side of frame plate 55. It will thus be seen that outward pulling motion of the stop time setting shaft 29 operates through the meshing gear sectors 311 and 308 to transmit counter-clockwise rotation to the cam gear 280 (as viewed in FIGURE 40). This counter-clockwise rotation of the cam gear is transmitted through the abutment of lug 286 against the end of arcuate slot 287 to cause corresponding counter-clockwise rotation of the operating gear 270. This swings operating gear 270 into the position shown in FIGURE 41, where the meshing drive from the gear sector 288 to the pinion 137 has caused the switch operating cam 138 to be revolved through approximately 180 degrees, and where the latching lug 268 has snapped into latching position behind the stop shoulder 291.

It may also be noted that, conversely, when inward pushing motion, as distinguished from the above described outward pulling motion, is imparted to the stop time shaft 29, this pushing motion operates through the meshing gear sectors 311 and 308 to impart a limited range of rotation to the cam gear 280 in a clockwise direction (FIGURE 40) relatively to the operating gear 270. This retracting rotation of cam gear 280 in a clockwise direction in opposition to the tension of the spring 302, and to the extent limited by the engagement of the lug 286 against the other end of the arcuate slot 287, operates through the rounded cam edge 305 to force the latching lug 268 in a retracting direction out of engagement with stop shoulder 291, as indicated in dotted lines in FIGURE 41. The purpose of this will be later described, after describing the mechanism which operates on the single tooth space 309 of operating gear 270.

Referring to FIGURE 46, it will be seen that a single tooth 325 is pivotally mounted at right angles to the operating gear 270 for entering the single tooth space 309 therein. This single tooth 325 is formed as one arm of a bell crank lever 326 which is pivoted at 327 to a right angle bracket 328 secured by screw 329 and raised lug 331 to the back side of frame plate 55. Extending laterally from the other end of bell crank lever 326 is a pin 333 which extends into the groove of a grooved collar or spool 334 that is secured to the outer rear end of cooking hours shaft 39. Formed in this shaft, forwardly of the collar or spool 334 is a groove 336 in which is confined a spring washer or ring 337 which is adapted to impart sliding movement to the aforementioned slidable compound gear 227. Also formed in the outer portion of the cooking hours shaft 39, in front of the face plate 10, is an annular groove 338 in which a spring ring or washer 339 is confined. By striking the front of the face plate 10, this spring washer 339 functions as a limiting stop for limiting the inward shifting movement of the cooking hours shaft 39.

Normally, the single tooth 325 lies at an inclined angle relatively to the rear face of the operating gear 270, with the tip end of this single tooth 325 riding on the outer surface of the operating gear, or spaced slightly therefrom, substantially as shown in FIGURE 46. At this time, the single tooth space 309 is not in position to receive the single tooth 325. Hence, outward pulling on the cooking hours knob 38 at this time will result in no effective motion of any of the parts because swinging movement of the single tooth 325 in a counter-clockwise direction (FIGURE 46), is blocked by the end of the single tooth striking the solid outer surface of the operating gear 270. This blocking action establishes an interlock which prevents the cooking hours shaft 39 from being pulled outwardly to perform a cooking hours setting before the stop time shaft 29 has been pulled outwardly. As soon, however, as the stop time shaft has been pulled outwardly for swinging the operating gear 270 into the position illustrated in FIGURE 41, this swings the single tooth space 309 into a position directly below the tip end of single tooth 325 so that the tooth can enter the tooth space. Thereafter, the cooking hours shaft 39 is free to be pulled outwardly, which results in counter-clockwise rotation of the single tooth 325 into the tooth space 309, following which the continued movement of the single tooth 325 causes the operating gear 270 to be advanced counter-clockwise one more step to the position shown in FIGURE 42. In this position, the automatically tripped latching lug 268 is snapped into latching position behind the second stop shoulder 292 of operating gear 270. Also, in this position, the switch operating cam 138 has been rotated through 90 degrees from FIGURE 41, so as to bring the other cam lobe 138a into switching actuating engagement with the switch operating arm 290.

FIGURES 40 to 44 inclusive show the different positions of the operating gear 270, cam gear 280 and switch operating arms 290 in the different stages or steps of the operating cycle.

FIGURE 40 shows these parts 270, 280 and 290 in the positions they occupy when the oven timer is in its normal "Manual" condition illustrated in FIGURE 1, at which time the switch operating cam 138 is then out of engagement with the switch operating arm 290 so that the timer switch is in its closed circuit position.

FIGURE 41 shows these parts in the positions they occupy when the timer is in its semi-automatic condition shown in FIGURE 4. This condition is established by the initial outward pulling of the stop time shaft 29, as for example when the housewife desires to have the cooking operation start immediately and to finish at a preselected time. In this position of the parts the stop lug 268 is abutting the first stop shoulder 291, and the cam 138 has reversed its position end for end from the position shown in FIGURE 40, but the switch operating arm 290 still remains in its switch closed position.

FIGURE 42 shows the parts in the positions they occupy when the timer is in its fully automatic condition shown in FIGURE 5. This condition is established by performing the second or later operation of pulling outwardly on the cooking hours shaft 39, which the housewife does when she wishes to have the oven cook for a predetermined number of hours and to finish cooking at a preselected time. In this position of the parts, the stop lug 268 is abutting the second stop shoulder 292, and the cam 138 is presenting its lobe 138a against the switch operating arm 290 for moving the switch to open circuit position.

Figure 43:
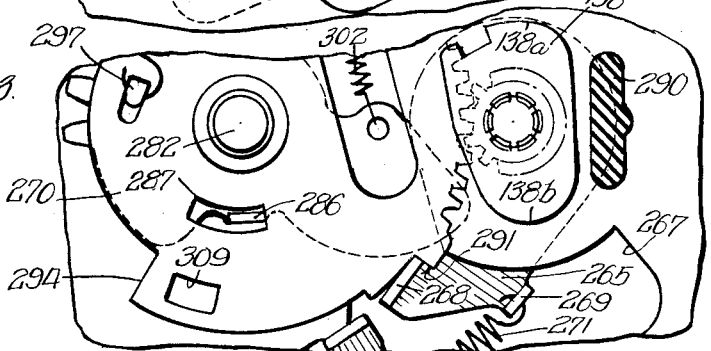

FIGURE 43 shows the parts in the positions they occupy when the oven has started to cook at a time commensurate with the number of cooking hours, corresponding to the condition shown in FIGURE 6. This position corresponds to the position of the parts shown in FIGURE 41, with the stop lug 268 abutting the first stop shoulder 291 and the cam 138 out of engagement with the switch operating arm 290, whereby the switch is in its closed circuit position.

Figure 44:
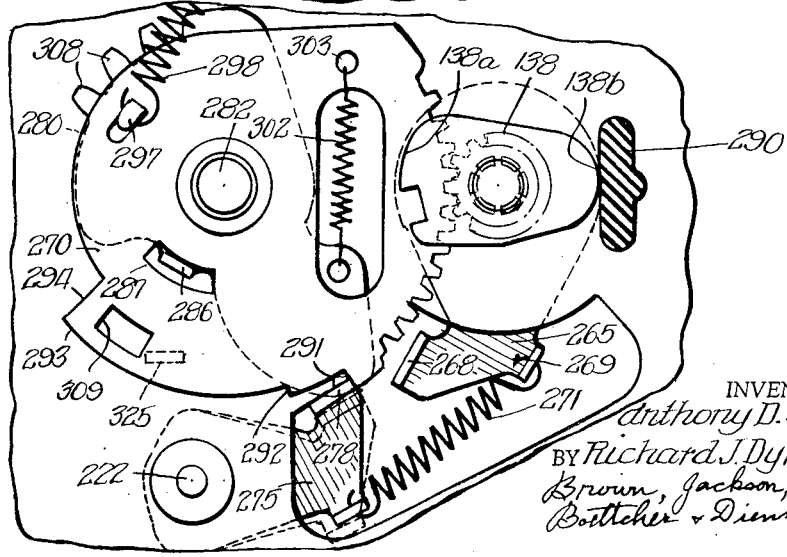

FIGURE 44 illustrates the position of the parts when the oven timer has completed its automatic cycle, corresponding to the condition shown in FIGURE 7. At this time, the stop shoulder 278 of tripping arm 275 is abutting the first stop shoulder 291, and the cam 138 is presenting its other lobe 138b against the switch operating arm 290 for moving this arm to switch open position. FIGURE 44 illustrates in dotted lines the cam gear 280 as having been swung to its releasing or restoring position, consequent upon the stop time shaft 29 being pushed to the "Push to Manual" position. This swinging of the cam gear 280 into the dotted line position serves to cam the stop lug 278 out of engagement with the first stop shoulder 291, so that the assembly of parts 270, 280 and 290 moves back to the normal position shown in FIGURE 40, corresponding to the normal "Manual" condition shown in FIGURE 1, thereby completing the cycle.

Referring now more particularly to the details of the gear drives for transmitting setting motion from the stop-time shaft 29 and from the cooking hours shaft 39 to the three settable dials 160, 170 and 180, it will be seen from FIGURE 45 that the stop-time shaft 29 has a rotative gear drive only to the stop-time tripping dial 170, which gear drive is permanently maintained in the different outward and inward shifted positions of the shaft 29. As previously described, the stop-time tripping dial 170 has a pinion 211 in mesh therewith, and permanently in mesh with this pinion 211 is the wide faced pinion 214 within which the stop-time shaft 29 has sliding keyed connection 216, 217. Thus, the stop-time shaft 29 remains permanently in mesh with the stop-time tripping dial 170 in each of the axially shifted positions of the shaft 29. Mounted on the reduced lower end of the tubular pivot stud 212 is a spacer or collar 212', and passing up through this collar and pivot stud is a pin 212" which is anchored in base plate 55.

Referring now to the selective gear transmission and interlocking mechanism 220 shown in FIGURES 46–52, which establishes different driving relations between the settable shafts and the settable dials, and which also establishes different interlocking relations for locking certain of the dials against rotation, this mechanism comprises the aforementioned compound slidable gear 227 which is slidably mounted on the cooking hours shaft 39 and within a free-slip bearing opening in the base plate 55, and is normally held in the rearwardly retracted position shown in FIGURES 46 and 47 by a compression spring 242 confined between the face plate 10 and the front end of the slidable gear 227. This front end of the gear has a counter-bored pocket 243 having a washer 243' therein, and the spring 242 can be compressed into this pocket when the slidable gear 227 is slid forwardly.

The rear end of the slidable gear 227 has a sleeve extension 244 projecting outwardly therefrom through the free slip opening in the back plate 55. This sleeve extension 244 is adapted to be engaged at its rear end by the motion transmitting ring 337 carried by the cooking hours shaft 39. This engagement occurs after the shaft 39 has been pulled outwardly through the lost motion distance necessary to bring the ring 337 up against the end of the sleeve extension 244. Thus, the first part of the outward pulling motion of the cooking hours shaft 39 imparts swinging movement to the single tooth 325, following which the continued motion of the shaft picks up the shiftable compound gear 227 and shifts it forwardly into the position shown in FIGURE 50. This shiftable gear 227 comprises front and rear pinions 228 and 229, which are spaced longitudinally from each other to provide a groove or annular space 230 therebetween, with which cooperates two of the interlocking pawls, to be later described.

Referring now to the coaxially aligned pinions which mesh with the toothed peripheries of the dials 160, 170 and 180, the front pinion 221 remains permanently in mesh with the cooking hours indicating dial 160; the second pinion 225 remains permanently in mesh with the stop time tripping dial 170; and the front gear 238 of the double gear 237 remains permanently in mesh with the cooking hours tripping dial 180. The rear pinion 239 of the double gear 237 is spaced rearwardly from the back side of time driven dial 190, this dial rotating idly through the annular space between the front and rear pinions 238 and 239 of double gear 237. No setting adjustments are given to the dial 190 because this dial receives a continuous time driven rotation from the synchronous motor 57.

When the shiftable compound gear 227 is in its normal rearwardly shifted position (FIGURES 46 and 47) it establishes a geared coupling from the stop time tripping dial 170 to the cooking hours tripping dial 180 so that these two dials then rotate directly together. Thus, any rotative movement transmitted at this time through stop time shaft 29 and gears 211, 214 to the stop time tripping dial 170 will in turn be transmitted through pinion 225 to the narrow front pinion 228 of compound shiftable gear 227. This will transmit rotation through the wide rear gear 229 to the rear pinion 239 of double gear 237, from whence rotation will be transmitted through the forward pinion 238 of this double gear to the cooking hours tripping dial 180.

When the shiftable double gear 227 is pulled into its forward position (FIGURE 50) by the forward pulling of the cooking hours shaft 39, it disconnects the coupled driving relation between the stop time tripping dial 170 and the cooking hours tripping dial 180; and in lieu thereof it establishes a coupled driving relation between the cooking hours indicating dial 160 and the cooking hours tripping dial 180 so that these two dials thereupon rotate directly together. This is effected by the front pinion 228 of shiftable gear 227 moving out of mesh with the pinion 225 and moving into mesh with the front pinion 221. This connects the front end of shiftable gear 227 with cooking hours indicating dial 160 through pinion 221. The rear pinion 229 of shiftable gear 227 has been moved forwardly into mesh with front pinion 238 of double gear 237, or into mesh with both the front and rear pinions 238 and 239 of this double gear, which establishes connection between the rear end of shiftable gear 227 and the cooking hours tripping dial 180, whereby the two dials 160 and 180 rotate directly together. Thus, when the cooking hours shaft 39 has been pulled forwardly, any rotative setting motion given to this shaft will be transmitted simultaneously to both the cooking hours indicating dial 160 and to the cooking hours tripping dial 180.

Referring now to the interlocking mechanism which interlocks the cooking hours indicating dial 160 against rotation at one stage of the setting operation, and which interlocks the stop time tripping dial 170 against rotation at another stage of the setting operation, it will be seen from FIGURES 47, 48, etc. that two duplicate interlocking pawls 351 and 352 are mounted directly on the outer side of the shiftable double gear 227 and on the outer side of the coaxial gear set 221, 225 and 237. These interlocking pawls are mounted for independent pivotal movement on a coaxial pivot stud 353 which is anchored at its rear end in the base plate 55 and which extends forwardly therefrom. These pawls comprise nose portions adapted to have blocking entry between the teeth of the associated pinions 221 and 225; i.e. the pawl 351 has a blocking nose 351a adapted to enter between the teeth of pinion 221; and the pawl 352 has a blocking nose 352a adapted to enter between the teeth of pinion 225. As shown in FIGURE 47, the other end of each of these pawls is bent rearwardly to form an offset finger portion offset rearwardly from the plane of the nose portion. These offset finger portions 351b and 352b function as feeler fingers for responding differentially to the presence of the front and rear pinions 228, 229 of shiftable gear 227 or for responding to the presence of the intermediate grooved portion 230 of this shiftable gear. These feeler fingers have arcuate feeler faces 351c, 352c which are adapted to have feeling engagement with the tips of the teeth of pinions 228 and 229 (FIGURES 49 and 51), or which are adapted to have free swinging movement into the annular groove space 230 (FIGURES 48 and 52) between these front and rear pinions. Hooked to notched tails of the feeler fingers 351b and 352b are tension springs 355 which extend outwardly for fixed attachment at their outer ends to a lug 357 which is bent forwardly from the edge of mounting bracket 328 (FIGURE 40). The springs 355 tend to hold the nose portions 351a and 352a pressed against their respective pinions 221 and 225. These nose portions are sloped in each direction so that rotation of their respective pinions in either direction will tend to cam the nose portion out of the tooth space between adjacent teeth in opposition to the pull of the spring 355. Whether the nose can be cammed out of the tooth space to thus free the pinion 221 or 225, will depend upon the presence or absence of the pinions 228 and 229 in proximity to the feeler fingers 351b and 352b. For example, in FIGURE 49 the pawl 351 is blocked in interlocking position by the position of the pinion 228 opposite to the feeler face 351c, which prevents the nose 351a from being cammed out of a tooth space of pinion 221, whereby pinion 221 is blocked against rotation. Conversely, in FIGURE 48 the feeler face 352c is free to swing back into the annular groove 230 of shiftable gear 227, by virtue of which the nose 352a can be cammed out of successive tooth spaces of pinion 225, as the result of which this pinion is free to rotate.

FIGURES 48 and 49 show the interlocking condition of the two pawls when the shiftable pinion 227 is in its normal rearwardly retracted position. At this time, the pawl 351 is blocking rotation of pinion 221, as a result of which the cooking hours indicating dial 160 is then held against rotation. At the same time, the other pawl 352 is free to oscillate its nose 352a into and out of succesive tooth spaces of the pinion 225 so that the stop time tripping dial 170 is then free to rotate.

FIGURES 51 and 52 illustrate the condition of the pawls 351 and 352 when the shiftable gear 227 has been pulled forwardly into the position illustrated in FIGURE 50. At this time, the pawl 351 is free to oscillate relatively to the successive tooth spaces of pinion 221, as a result of which the cooking hours indicating dial 160 is free to rotate. Conversely, the other pawl 352 has its oscillation blocked by the teeth of pinion 229 so that pinion 225 is held stationary, as a result of which the stop time tripping dial 170 is blocked against rotation.

It will be seen from the foregoing description of the shiftable double gear 227 that in its shifting movement from its rear position (FIG. 46) to its front position (FIG. 50) and back, it performs the several functions of selectively coupling and uncoupling certain pairs of dials for conjoint rotation, and also of selectively locking and unlocking certain dials to prevent or permit their rotation. For example, when this shiftable double gear 227 is in its normal rearward position it performs a first function of positively coupling or interlocking the stop time tripping dial 170 to the cooking hours tripping dial 180, so that if and when the housewife should decide to rotate the stop time shaft 29 in a stop time setting operation, these two tripping dials 170 and 180 will be positively compelled to rotate together. The reason for establishing this positively coupled or interlocking relation at this time is that the relation between the two settable tripping lugs 173 and 183 on these two tripping dials must be maintained with respect to the number of cooking hours that are indicated on the cooking hours indicating dial 160. If this relation is not maintained, the timer could get out of register. If the timer should get out of register, the housewife could set and read the number of cooking hours that she desired, but the timing cycle would actually produce an entirely different number of cooking hours. Also, when this shiftable double gear 227 is in its normal rearward position it performs the second function of holding pawl 351 in its interlocking position (FIG. 49) so that cooking hours indicating dial 160 is positively interlocked against rotation.

On the other hand, when this shiftable double gear 227 is pulled into its forward position (FIG. 50) it performs a third function of positively coupling or interlocking the cooking hours indicating dial 160 to the cooking hours tripping dial 180, so that if and when the housewife should decide to rotate the cooking hours shaft 39 in a cooking hours setting operation, these two cooking hour dials 160 and 180 are positively compelled to rotate together. Also, when this shiftable double gear 227 is in its forward position, it is performing the fourth function of holding pawl 352 in its interlocking position so that stop time tripping dial 170 is positively interlocked against rotation. This, of course, operates through gears 211 and 214 to lock the stop time knob 28 and shaft 29 against rotation. The reason that stop time shaft 29 and stop time tripping dial 170 are made non-rotatable at this time is that if this stop time shaft 29 and stop time tripping dial 170 were turned after the cooking hours shaft 39 had been pulled out, such turning would change the position of the stop time tripping lug 173, which would change the actual number of cooking hours but would not change the cooking hours indicated on dial 160. Therefore, the cooking hour indication would be meaningless.

Still another interlock, previously alluded to, is that which requires the housewife to pull out the stop time shaft 29 before she pulls out the cooking hours shaft 39, so as to compel the setting of the stop time before the setting of the cooking hours time. As previously described, if it is attempted to pull out the cooking hours shaft 39 before pulling out the stop time shaft 29, the single tooth 325 (FIG. 46) swings in a counter-clockwise direction but strikes the solid back surface of the operating gear 270, so that effective outward pulling of the cooking hours shaft 39 is prevented at this time. It is only after the stop time shaft 29 has been pulled out that the back surface of the operating gear 270 is rotated to the point where the single tooth notch 309 is presented to the path of the single tooth 325, as a result of which outward pulling motion of the cooking hours shaft 39 is then permitted.

A further interlock is provided to prevent any attempted restoration of the cooking hours knob 38 back to its inward or retracted position, after this cooking hours knob has been pulled outwardly for establishing a cooking hours setting. As previously described, this outward pulling of cooking hours knob 38 swings single tooth 325 into single tooth space 309, thus advancing operating gear 270 into the position shown in FIGURE 42. In this position, latching lug 268 snaps behind stop shoulder 292 and prevents retractive rotation of the operating gear 270 in a clockwise rotation. Because single tooth space 309 cannot move backward it follows that single tooth 325 likewise cannot move backward, and hence the knob 38 and shaft 39 cannot be pushed back inwardly after they have once been pulled outwardly for establishing an hours-to-cook setting. The only way that this cooking hours knob can be restored to its inner retracted position is for the housewife to push the stop time setting knob 28 back to its normal "Manual" position (FIGURE 1).

Referring now to the details of the electric switch 58 shown in FIGURES 53, 54, etc., this switch comprises a frame or open housing 360 of insulating material and formed with a back wall portion 361 on which are mounted the switch contacts. Extending forwardly from two corners of this back wall portion are mounting legs 362, 362, and extending forwardly from the other end of the back wall portion at its center is a third mounting leg 363. The base ends of these three mounting legs 362 and 363 are provided with apertures 364 for receiving the three mounting screws 365 (FIG. 2) which thread into the back mounting plate 55 for securing the switch frame in place. The previously described switch operating arm 290 is formed as part of an L-shaped contact actuator 368 which is mounted for rocking movement against the underside of the back wall portion 361. This actuator 368, which is molded of insulating material, has two outwardly extending wing portions 369. Formed across the back of the head and the back of these wing portions is a relatively long V-shaped rocker groove 371 which has rocker mounting on a V-shaped rocker wedge 372 that projects forwardly from the inner surface of the back wall portion 361. The actuator is held on this rocker mounting by a spring plunger rod 375 which passes through the back wall portion 361 and through a loose aperture in an arm 377 projecting laterally from the center of the actuator 368. A head 378 and washer 379 on the rear end of the rod prevent the rod from being drawn forwardly through the back wall 361. A sliding washer 381 is mounted on the rod to bear against the front side of the actuator arm 377, and confined on the rod between this washer 381 and a head 382 at the front end of the rod, is a compression spring 383. This compression spring normally holds the contact actuator rocked into the position shown in FIGURE 53. Projecting from the outwardly extending wing portions 368 are laterally extending stub arms 384. In the embodiment of switch illustrated in FIGURES 54-56, these stub arms 384, 384 mount the movable switch contacts. As shown in FIGURE 55, the outer or rear surfaces of these stub arms 384 are formed with a convex curvature 385, and rockably mounted on such convex curvature of each stub arm is a contact carrying plate 386. A tubular eyelet 387 passes through each stub arm 384 and thence passes loosely through each contact carrying metallic plate 386. Each metallic plate 386 carries two movable contacts 388 on its back side which are adapted to engage cooperating pairs of stationary contacts 390 secured to terminal clips 391 stationarily mounted in recesses in the back wall portion 361. The contact carrying plates 386 are prevented from having any substantial swiveling movement around the axes of the eyelets 387 by reason of the edges of these contact carrying plates striking the adjacent surfaces of the wing extensions 369. Normally, the movable contacts 388 are held in engagement with the stationary contacts 390 under the action of the spring plunger rod 375, but when one of the lobes 138a or 138b of switch operating cam 138 moves into engagement with the switch operating arm 290 this arm is deflected around the rocker mounting 371, 372, with resulting separation of the contacts 388 and 390.

In FIGURES 57 and 58, we have illustrated a modified construction which uses the same identical frame housing 360 and the same identical switch actuator 368. In this modified embodiment the movable contacts are not carried on the laterally separated stub arms 384, but instead have rocker mounting on the centrally located stub arm 377. The forward surface of this centrally located stub arm 377 has a convex curvature 393. Rockably mounted on this convex curvature is a centrally dipped plate 394 carrying underside movable contacts 395 and back-side movable contacts 395' on its outwardly extending arms. The spring plunger rod 375 passes loosely through an aperture in the contact carrying plate 394 so as to hold this contact carrying plate pressed in rockable relation against the convex curvature of the central stub arm 377. The under-side movable contacts 395 are adapted to effect engagement with an optional arrangement of stationary contacts 390' carried by terminal clips 391'. This is a double throw embodiment of switch, and when the under-side movable contacts 395 separate from the stationary contacts 390' in the forward cam operated throw of the switch actuator 368, the back-side movable contacts 395' move forwardly into engagement with another pair of stationary back contacts 396 which are carried by terminal clips 397 anchored to the back wall portion 361. Various optional arrangements of back contacts 396 may be employed. The embodiment of switch shown in FIGURES 54–56 is for electrically heated ranges, and the embodiment shown in FIGURES 57–58 is for gas heated ranges having an electrically energized gas valve.

A brief functional description of the operation of the range timer has been previously given in connection with FIGURES 4, 5, 6 and 7. We shall now briefly supplement that description by describing briefly the operation of the parts. In connection with FIGURE 4, it will first be assumed that the housewife desires to have the timer perform a semi-automatic timing operation, that is to say, one where the stop cooking time is set up on the timer but no cooking hours time is set up; i.e. a timer operation in which the cooking operation starts immediately and terminates at a preselected hour. It will also be assumed that this preselected stop cooking hour is 6:00 o'clock. The housewife first pulls outwardly on the stop-time setting knob 28, which swings the legend "Manual" out of the stop-time sight window 35 and brings the arcuate window 143 in the target dial 140 into registration with the stop-time sight window 35, whereby the numerals on the stop-time indicating dial 155 show through the sight window 35 (FIGURE 4). It will also be assumed that 6:00 o'clock has become the established stop cooking time in this particular household. Hence, the numeral "6" now appears in the sight window 35, and hence the housewife does not need to turn the stop-time knob 28 and stop-time indicating dial 155. If, on the other hand, some other numeral appeared in the sight window 35, she would then have to rotate the knob 28 to bring the numeral "6" into the center of the sight window 35. It should also be noted that when the legend "Manual" swung out of the upper stop-time sight window 35, the red target area 49 swung into the lower cooking hours sight window 45, thereby denoting that the electrical heating element in the oven or range is now turned on. Thus, the semi-automatic cooking cycle has now been set up on the timer, and the cooking operation is proceeding. It is possible to set up a semi-automatic cooking cycle for any period up to 11¾ hours.

In setting up this semi-automatic cycle, when the stop-time knob 28 and shaft 29 were pulled outwardly this operated through gear sectors 311 and 308 to swing the operating gear 270 from the position shown in FIGURE 40 to the position shown in FIGURE 41. In this latter position the tripping stop 268 latched behind the first stop shoulder 291 on the operating gear 270, and the cam 138 has now reversed end for end, leaving the switch operating arm 290 in its original spring pressed position to the left, with the electric switch still closed. If any rotational setting of stop-time knob 28 is necessary, this results in the cooking hours tripping dial 180 being rotated concurrently with the stop-time tripping dial 170 through the selective gear transmission mechanism 225, 227, 237, etc., while the cooking hours indi-cating dial 160 remains stationarily locked by interlocking pawl 351 (FIGURE 49). The cooking operation immediately starts and proceeds until the preset stop cooking time arrives, at which time the stop tripping lug 173 is engaged by the nose 195 of tripping lever 194 carried by the time driven wheel 190. This operates through the planetary pinion 197 to impart a corresponding rotation to the sun gear 200. Such motion of the sun gear operates the tripping arm 265 to swing the stop dog 268 out of engagement with the stop shoulder 291, which results in the switch operating spring 298 swinging the operating gear 270 to bring the stop shoulder 291 up against the stop dog 278 on the secondary tripping arm 275. This spring returned motion of the operating gear 270 swings cam 138 into the switch opening position and also swings the target dial to present the legend "Push to Manual" in the upper stop-time sight window 35, and to present the legend "Oven Off" in the lower cooking hours sight window 45 (FIGURES 7 and 44). When the housewife removes the meal at 6:00 o'clock or shortly after, she pushes inwardly on stop-time setting knob 28. This imparts retractive movement through gear sectors 311 and 308 for swinging the cam gear 289 in a clockwise direction, thereby bringing the cam slope 305 against the tripping stop 278 for forcing it out of registration with stop shoulder 291 (FIGURE 44). The freeing of operating gear 270 results in its swinging back to bring its stop shoulder 294 up against the stop lug 295. In this position of the operating gear the cam 138 is in the switch closing position illustrated in FIGURE 40 and the target dial is in the position to present the legend "Manual" in the stop-time sight window 35, as shown in FIGURE 1.

Referring now to the completely automatic cycle of the timer, let it be assumed that the above described cooking operation to terminate at 6:00 o'clock will require only two hours of cooking time, and that it is now substantially in advance of 4:00 o'clock. Under these circumstances the housewife performs the second setting operation of pulling outwardly on the cooking hours setting knob 38, in order to set up the hours-to-cook setting on the range timer. This operates through single tooth 325 and single tooth space 309 to swing the operating gear 270 into the position where the second stop shoulder 292 latches over the stop dog 268 (FIG. 42). Such rotates the cam 138 to bring its lobe 138a into switch opening position, and also rotates the target dial 140 to bring the sector window 146 into registration with the cooking hours sight window 45. This exposes the cooking hours indicating dial 160 at the cooking hours sight window 45, as shown in FIGURE 5. If the numeral "2" should, by chance, appear in the center of this latter sight window, the housewife does nothing further. If some other number should appear, she rotates the cooking hours setting knob 38 until the numeral "2" appears in the sight window 45. This completes the manual setting operation for a completely automatic cycle of the timer. In such rotation of the cooking hours shaft 39, the cooking hours tripping dial 180 is rotated concurrently with the cooking hours indicating dial 160 through the selective gear transmission mechanism 221, 228, 229, 238, etc. (FIGURE 50), while the stop-time tripping dial 170 remains stationarily locked by interlocking pawl 352 (FIGURE 51).

When the time commensurate with the cooking hours setting has expired (i.e. substantially the hour of 4:00 o'clock has arrived), the cooking hours tripping lug 183 is engaged by the tripping lever 194 of time driven wheel 190, which operates through planetary pinion 197 to impart momentary rotary movement to sun gear 200 and to stop dog 268 of tripping arm 265 carried by the sun gear. The releasing movement of stop dog 268 releases the relatively shallow stop shoulder 292 on operating gear 270 (FIGURE 42), with resulting counter-clockwise rotation of this operating gear from the position shown in FIGURE 42 to the position shown in FIGURE 43, in which latter position the relatively deep stop shoulder 291 comes into abutment against the stop dog 268. In this position the switch operating cam 138 has revolved away from the switch operating arm 290 so that the electric swtich 53 moves to closed circuit position and the cooking operation starts. During such rotation of switch operating cam 138, the central shaft 136 also rotates the shutter dial 140 so as to present the red target area 49 in the lower cooking hours sight window 45 to give a visual indication that the range or oven is now turned on, as illustrated in FIGURE 6.

When the approximate hour of 6:00 o'clock arrives, the tripping lever 194 of time dirven wheel 190 engages the stop-time tripping lug 173, which again operates through planetary pinion 197 to impart momentary rotation to sun gear 200 and to stop dog 268, for swinging this stop dog clear of the relatively deep stop shoulder 291 on operating gear 270. This results in another step of counter-clockwise rotation of the gear assembly 270, 280 from the position shown in FIGURE 43 to the position shown in FIGURE 44, in which latter position the deep stop shoulder 291 has come up against the secondary stop dog 278 on secondary tripping arm 275. Movement into the position shown in FIGURE 44 has caused the cam lobe 138b to swing switch operating arm 290 into the switch opening position, with the resulting stopping of the cooking operation. The rotation of central shaft 136 has also rotated the shutter dial 140 to present the legend "Push to Manual" in the upper stop-time sight window 35, and to present the legend "Oven Off" in the lower cooking hours sight window 45, as shown in FIGURE 7. The completely automatic cycle of the timer is now completed, subject to the housewife pushing inwardly on stop-time setting knob 28 to cause the timer to be returned to "Manual" (FIGURE 1). As previously described, this inward pushing on stop-time knob 28 operates through sector gears 311 and 308 to swing the cam gear 280 into the position shown in dotted lines in FIGURE 44, in which position the cam slope 305 forces the secondary stop dog 278 out of engagement with deep stop shoulder 291 so that the gear assembly 270, 280 and switch operating cam 138 can revolve back into the normal position shown in FIGURE 40, with the "Manual" legend appearing in the stop-time sight window 35, as shown in FIGURE 1.

Inasmuch as the stop-time indicating dial 155 and stop-time tripping dial 170 are permanently keyed together by the two keys 172 of dial 170 engaging in the two diametrically opposite keyways 153 of dial 155 (FIGURES 22 and 27), it necessarily follows that these two stop-time dials can never get out of registration with each other. With regard to the cooking hours indicating dial 160 and the cooking hours tripping dial 180, these two cooking hour dials are maintained in registration through the functioning of the selective gear transmission and interlocking mechanism 220 comprising the gears 221, 225, 227, etc. For example, when the above described cooking operation was completed, it left the timer with an hours-to-cook setting of 2 hours. That is to say, the cooking hours tripping lug 183 is now so positioned with respect to the stop-time tripping lug 173 that these two lugs are angularly separated from each other by a distance equal to substantially ⅖ of the angular length of the arcuate slot 182, this following because the entire length of the slot corresponds to slightly more than the 5 hours marked off on cooking hours indicating dial 160. Now let us assume that early the next morning the housewife wishes to set the timer to perform a complete cyclical cooking operation having a cooking hours setting of the same 2 hours' duration, but having a stop-time setting of 12:00 o'clock noon, instead of 6:00 o'clock in the evening. She pulls outwardly on stop-time knob 28 and then turns it to present the 12:00 o'clock designation in the stop-time sight window 35. She next pulls out the cooking hours knob 38, but immediately upon the red target area 49 swinging out of the cooking hours sight window 45, she notes that the previous cooking hours setting of 2 hours still stands, and hence she does not turn knob 38. Now with respect to the continued registration between cooking hours indicating dial 160 and cooking hours tripping dial 180, when she turned the stop-time knob 28 to set up the new stop-time of 12:00 o'clock, she turned the stop-time tripping dial 170 and the cooking hours tripping dial 180 together as one single assembly, because these two tripping dials are now positively geared together through the pinions 225, 228, 229 and 238 of the selective gear transmission and interlocking mechanism 220 (FIGURE 46) at which time the cooking hours indicating dial 160 is also positively interlocked against motion (FIGURE 49) in its 2 hour setting. Hence, the same angular spacing between the two tripping lugs 173 and 183 remains, with the two lugs separated by a distance equal to approximately ⅖ of the length of the arcuate slot 182. This same angular spacing of ⅖ of the length of the slot will remain, irrespective of whether the housewife chooses a stop-time of 12:00 o'clock, 6:00 o'clock or any other time. When she set the stop-time indicating dial 155 at 12:00 o'clock, she left the two tripping lugs 173 and 183 at this same angular spacing of ⅖ of the length of the slot 182, with the stop lug 183 in position to cause switch actuation at 10:00 o'clock, and with the stop lug 173 in position to cause switch actuation at 12:00 o'clock. When she pulled outwardly on cooking hours knob 38, she found the cooking hours indicating dial 160 in the same position in which it was left, with the numeral "2" designating the cooking hours interval. Thus, the registration of the two cooking hours dials 160 and 180 has been maintained. Of course, if she now turns the cooking hours setting knob 38, she operates through the selective gear mechanism 220 to turn the two cooking hour dials 160 and 180 together, while the stop-time tripping dial 170 remains interlocked (FIGURE 51), so that she alters the cooking hours setting by changing the angular distance or length of slot 182 intervening between the two tripping lugs 173 and 183. This changed cooking hour setting (or changed intervening length of slot 182) will be picked up and maintained in any later change in stop-time setting. Thus, the registration of the stop-time dials and the cooking hour dials is accurately maintained at all times.

Referring now to the correlation which exists between the different degrees of angular span of the two settable tripping lugs 173, 183 (FIGURES 34 and 35), and the different degrees of depth of the two stop shoulders 291, 292 of the operating gear 270 (FIGURE 38), it will be seen that the greater angular span of the stop-time tripping lug 173, as compared to the angular span of the cooking hours tripping lug 183, will result in the sun gear 200 and stop dog 268 being rotated through a longer interval of time in response to tripping lug 173 than in response to tripping lug 183. This means that the stop dog 268 will be moved a further distance in its counter-clockwise releasing motion (FIGURES 40–44) by the stop-time tripping lug 173 than it will by the cooking hours tripping lug 183. The parts are so proportioned that the releasing movement of stop dog 268 effected by the narrower cooking hours tripping lug 183 will just be sufficient to enable the stop dog 268 to clear the shallow stop shoulder 292 (FIGURE 42) but not enough to clear the deeper stop shoulder 291. On the other hand, the wider stop-time tripping lug 173 will cause the stop dog 268 to swing sufficiently far to clear both stop shoulders 291 and 292 (FIGURE 44), so that the operating and cam gear assembly 270, 280 will swing into the position shown in FIGURE 44, with the stop shoulder 291 abutting against the secondary stop dog 278 on the secondary tripping arm 275. This corresponds to the open circuit position of the switch 58, shown in FIGURE 7 as the "Push to Manual" position. Accordingly, if the housewife has carelessly attempted to set the timer for a longer cooking period than time permits, and has therefore over traveled or established a setting where the sloping tail portion 195 of time driven tripping lever 194 is already occupying a position clockwise beyond or past the cooking hours tripping lug 183, so that it is too late for this lug 183 to initially trip the electric switch to closed position, the subsequent action of the stop-time tripping lug 173 will be to swing the stop dog 268 clear of both stop shoulders 291 and 292, so that the operating gear 270 will be swung through to its switch open or "Push to Manual" position shown in FIGURES 7 and 44. Hence, there will be no burning of the meal or indefinite heating of the range heating element, which would otherwise likely occur if the stop-time lug 173 initially tripped the electric switch to closed circuit, with no later tripping lug standing by, ready to retrip the switch back to open circuit position at a later hour.

In summarizing some of the advantages of our invention, one of the salient advantages is that the timer is made very easy to operate by the presence of the operating instructions on the face panel 10 and in the sight windows 35 and 45. Also, it is advantageous to have the sequence of the cooking cycle clearly indicated in the sight windows 35 and 45, so that the housewife can tell at any time where in the cooking cycle the range or oven is then operating. This is especially advantageous in the "Oven Off" position, where, in order to operate the oven manually, the automatic range timer must be taken out of the circuit. The housewife is directly apprised to do this by the appearance in the sight window 35 of the legend "Push to Manual." Furthermore, the "Hours to Cook" time is set up on the present timer rather than the previously employed "Start Time." The "Hours to Cook" setting complies with cook book terminology, and eliminates a mathematical calculation on the part of the housewife. Still further, the setting of the electric switch 58 is made a part of the time setting function of the timer, thereby avoiding the necessity of the housewife having to perform a separate switch setting operation. Finally, the timer settings and controls are completely separated from the electric clock, thereby avoiding a complicated looking dial, and also avoiding confusion with clock settings, etc.

While we have illustrated and described what we regard to be the preferred embodiment of our invention, nevertheless it will be understood that such is merely exemplary, and that numerous modifications and rearrangements may be made therein without departing from the essence of the invention.

We claim:

1. In a time switch, the combination of a housing, first and second stationary sight windows in said housing, first and second numbered dials adapted to present numbers in said first and second sight windows corresponding to pre-selected times at which it is desired to have automatic switch operation occur, means mounting said first and second numbered dials for concentric rotation about a common axis, first and second setting knobs each capable of rotational motion and of shifting motion for manually setting said first and second dials, interlocking means responsive to such shifting motion for compelling the shifting of said first knob before the shifting of said second knob in the setting of said dials, a time driven member, and electric switch means responsive to said time driven member and to said dials for automatically moving to closed and open circuit positions at the pre-selected times set up in said sight windows.

2. In a time switch, the combination of a panel, first and second stationary sight windows in said panel, first and second manually rotatable setting knobs associated with said sight windows, one of said setting knobs being also capable of shifting movement, first and second numbered dials responsive to the rotary movement of said setting knobs for presenting numbers in said sight windows corresponding to pre-selected times at which it is desired to have automatic switch operation occur, a shutter dial disposed in front of one of said numbered dials, means mounting said first and second numbered dials and said shutter dial for concentric rotation about a common axis, said shutter dial comprising a visual target adapted to be presented in one of said sight windows and being movable relative thereto in response to the shifting movement of said shiftable setting knob, interlock mechanism responsive to such shifting movement for compelling the setting of one of said dials in advance of the setting of the other of said dials, an electric switch, and automatic mechanism for actuating said electric switch in response to the settings given to said dials.

3. In a time switch, the combination of a panel, first and second stationary sight windows in said panel, first and second manually rotatable setting knobs associated with said sight windows, one of said setting knobs being also capable of shifting movement, first and second numbered rotatable dials responsive to the rotary movement of said setting knobs for presenting numbers in said sight windows corresponding to pre-selected times at which it is desired to have automatic switch operation occur, interlock mechanism responsive to such shifting movement for compelling the setting of one of said dials in advance of the setting of the other of said dials, a rotatable visual target adapted to be presented in one of said sight windows and being movable relative thereto in response to the shifting movement of said shiftable setting knob, said visual target being rotatable independently of said first and second numbered dials, an electric switch, automatic tripping mechanism for actuating said electric switch in response to the settings given to said dials, and means responsive to movement of said electric switch for causing movement of said target relatively to its associated sight window.

4. In a time switch, the combination of a panel, first and second stationary sight windows in said panel, first and second manually operable setting knobs for said first and second sight windows, said knobs being capable of rotary movement and of shifting movement, first and second numbered rotatable dials responsive to rotary movement of said knobs for presenting numbers in said first and second sight windows corresponding to pre-selected switch operating times, a rotatable shutter dial comprising first and second visual targets adapted to be presented in said first and second sight windows, said first and second numbered dials and said shutter dial being concentrically mounted for rotation about a common axis, each of said three dials being capable of rotation independently of the others, said common axis of said three dials being located along a line intermediate said first and second sight windows in said panel, means for rotating said shutter dial for presenting said visual targets relatively to their respective sight windows in response to shifting movement of said first and second knobs, tripping lugs moving with said dials, an electric switch, automatic switch actuating mechanism responsive to said tripping lugs for actuating said electric switch at the pre-selected times, and mechanism responsive to movement of said electric switch into different positions for causing movement of said first and second targets relatively to said first and second sight windows.

5. In a time switch, the combination of a panel, an electrically operated clock in one part of said panel, first and second stationary sight windows in another part of said panel, first and second rotatable indicating dials concentrically mounted for independent rotation about a common axis and adapted to present indicia in said first and second sight windows corresponding to the pre-selected times at which it is desired to have automatic switch operation occur, said common axis about which both of said dials rotate being located along a line which passes intermediate said first and second sight windows but closer to one of said sight windows than to the other, first and second switch tripping lugs moving into pre-set position with said first and second dials, first and second setting knobs for setting said first and second dials, a time driven member driven by said electric clock, an electric switch, and mechanism for automatically operating said electric switch at the pre-set times comprising tripping means carried by said time driven member and operative to engage said tripping lugs for effecting automatic operation of said electric switch.

6. In a time switch, the combination of a housing, first and second stationary sight windows in said housing, first and second numbered dials mounted for independent concentric rotation about a common axis and adapted to present numbers in said first and second sight windows corresponding to the pre-selected times at which it is desired to have automatic switch operation occur, first and second switch tripping lugs moving into pre-set positions with said first and second dials, first and second setting knobs for setting said first and second dials in either direction of adjustment by rotating said knobs in either direction of rotation, a time driven wheel, a toothed wheel associated therewith, both of said wheels having concentric rotatable mounting on the common axis of said first and second numbered dials, motion transmitting means operable by said tripping lugs comprising a planetary pinion carried by said time driven wheel adapted to impart intermittent movement to said toothed wheel, said first and second tripping lugs being disposable at different points around said time driven wheel for causing actuation of said motion transmitting means at different times, and an electric switch responsive to the intermittent movement of said toothed wheel.

7. In a range timer, the combination of a panel, a stationary stop-time sight window in said panel, a stop-time indicating dial adapted to present numerals in said stop-time window for indicating when the cooking operation is to stop, a rotatable and shiftable stop-time knob operable by rotation to turn said stop-time indicating dial, a first rotatable target area movable out of said stop-time sight window by shifting movement of said stop-time knob, a stationary cooking hours sight window in said panel, a cooking hours indicating dial adapted to present numerals in said cooking hours sight window for indicating the number of hours that the cooking operation is to continue, means mounting said stop time indicating dial and said cooking hours indicating dial for concentric rotation about a common axis, said common axis extending rearwardly of said panel and sight windows along a line which passes intermediate said two sight windows, a rotatable and shiftable cooking hours knob operable by rotation to turn said cooking hours indicating dial, a second rotatable target area movable out of said cooking hours sight window by shifting movement of said cooking hours knob, an electric switch, mechanism responsive to the settings of said dials for controlling the operation of said electric switch, and interlock mechanism for compelling shifting of said stop-time knob before shifting of said cooking hours knob in the setting of said range timer.

8. In a range timer, the combination of a panel, a stationary stop-time indicating sight window in said panel, a shiftable and rotatable stop-time setting knob associated with said stop-time sight window, a first target area normally disposed in said stop-time sight window, means responsive to shifting movement of said stop-time knob for moving said first target area out of said window, a stop-time indicating dial adapted to thereupon present stop-time numerals in said window for indicating when the cooking operation is to stop, means responsive to rotational motion of said knob in either direction for rotating said stop-time indicating dial in either direction of adjustment, a stationary cooking hours sight window in said panel, a shiftable and rotatable cooking hours setting knob associated with said cooking hours sight window, a second target area normally disposed in said cooking hours sight window, means responsive to shifting movement of said cooking hours setting knob for moving said second target area out of said cooking hours sight window, a cooking hours indicating dial adapted to thereupon present cooking hour numerals in said cooking hours window for indicating the number of hours that the cooking operation is to continue, means responsive to rotational motion of said cooking hours knob in either direction for rotating said cooking hours indicating dial in either direction of adjustment, said two indicating dials both rotating on a common axis extending along a line passing intermediate said stop time indicating sight window and said cooking hours sight window, an electric switch, tripping mechanism responsive to the settings of said two dials for effecting the operation of said switch at the pre-selected times, interlocking mechanism for compelling shifting movement of said stop-time setting knob before shifting movement of said cooking hours setting knob can be effected, and interlocking mechanism for locking said stop-time setting knob against rotation after said cooking hours setting knob has been shifted.

9. In a range timer, the combination of a panel, an electrically operated clock in one part of said panel, a stop-time indicating sight window and a cooking hours indicating sight window in another part of said panel, a stop-time setting knob and a cooking hours setting knob associated with their respective sight windows, said knobs having both rotary movement and outward and inward shifting movement, a target dial mounted for rotation behind said sight windows, said dial having in its inner radial zone a first set of target areas and a window opening adapted to register with one of said sight windows, and having in its outer radial zone a second set of target areas different from said first set of target areas, and a window opening adapted to register with the other of said sight windows, means responsive to outward shifting movement of both of said knobs of rotatively advancing said target dial, a stop-time indicating dial mounted for rotation behind said target dial and concentrically thereof and having numerals thereon adapted to be presented at said stop-time sight window, means responsive to rotary movement of said stop-time knob for rotating said stop-time indicating dial, a cooking hours indicating dial mounted for rotation behind said target dial and concentrically thereof and having numerals thereon adapted to be presented at said cooking hours sight window, means responsive to rotary movement of said cooking hours setting knob for rotating said cooking hours indicating dial, an electric switch, and mechanism deriving operating energy from said electric clock and responsive to the settings given to said two dials for controlling said electric switch.

10. In a range timer, the combination of a panel, a stationary stop-time indicating sight window in said panel, a stop-time setting knob associated with said sight window, a stop-time indicating dial and a stop-time tripping dial behind said sight window and both permanently connected together, said stop-time indicating dial having a first set of numerals thereon located at a first radius adapted to be presented at said stop-time indicating window, said stop-time tripping dial having a stop-time tripping lug thereon, means responsive to rotary movement of said stop-time setting knob for rotating said two stop-dials, said stop-time tripping lug remaining stationary in the preset stop-time position established by the setting of said stop-time setting knob, a stationary cooking hours indicating sight window in said panel, a cooking hours setting knob associated with said latter window, a cooking hours indicating dial and a cooking hours tripping dial disposed behind said cooking hours sight window, said cooking hours indicating dial having a second set of numerals thereon located at a second radius different from said first radius adapted to be presented at said cooking hours sight window, means establishing a common axis around which said stop time indicating dial and said stop time tripping dial together with said cooking hours indicating dial all have concentric rotation, said common axis being closer to one of said sight windows than to the other sight window so as to accommodate the different radii of said first and second sets of numerals, said cooking hours tripping dial having a cooking hours tripping lug thereon, means responsive to rotary movement of said cooking hours setting knob for rotating said two cooking hours dials, said cooking hours tripping lug remaining stationary in the preset cooking hours position established by the setting of said cooking hours setting knob, a time driven member, an electric switch, and mechanism responsive to the stationary preset positions of said two tripping lugs and to said time driven member for actuating said electric switch.

11. In a range timer, the combination of a panel, a stop-time indicating sight window and a cooking hours indicating sight window in said panel, a stop-time setting knob and a cooking hours setting knob associated with their respective sight windows, a stop-time indicating dial having numerals thereon adapted to be presented at said stop-time indicating sight window, means responsive to rotation of said stop-time setting knob for rotating said stop-time indicating dial, a stop-time tripping dial associated with said stop-time indicating dial and having a tripping lug thereon, a cooking hours indicating dial having numerals thereon adapted to be exposed at said cooking hours indicating sight window, means responsive to rotary motion of said cooking hours setting knob for rotating said cooking hours indicating dial, a cooking hours tripping dial associated with said cooking hours indicating dial and carrying a tripping lug, selective gear transmission mechanism operative in a first position of one of said knobs for gearing said stop-time tripping dial and said cooking hours tripping dial together for conjoint rotation, and operative in a second position of said latter knob for gearing said cooking hours tripping dial and said cooking hours indicating dial together for conjoint rotation, a time driven member, an electric switch, and mechanism automatically responsive to said time driven member and the positions of said tripping lugs for operating said electric switch.

12. In a range timer, the combination of a panel, a stop-time indicating sight window and a cooking hours indicating sight window in said panel, a stop-time setting knob and a cooking hours setting knob associated with their respective sight windows, a stop-time indicating dial having numerals thereon adapted to be presented at said stop-time indicating sight window, means responsive to rotation of said stop-time setting knob for rotating said stop-time indicating dial, a stop-time tripping dial associated with said stop-time indicating dial and having a tripping lug thereon, a cooking hours indicating dial having numerals thereon adapted to be exposed at said cooking hours indicating sight window, means responsive to rotary motion of said cooking hours setting knob for rotating said cooking hours indicating dial, a cooking hours tripping dial associated with said cooking hours indicating dial and carrying a tripping lug, selective gear transmission mechanism responsive to the movement of one of said knobs, means responsive to the movement of said latter knob into a first position for establishing a geared relation through said transmission mechanism between said stop-time tripping dial and said cooking hours tripping dial for conjoint rotation, an interlocking pawl, means responsive to the movement of said latter knob into said first position for causing said interlocking pawl to lock said cooking hours indicating dial against rotation, means responsive to the movement of said latter knob into a second position for establishing a geared relation through said transmission mechanism between said cooking hours tripping dial and said cooking hours indicating dial for conjoint rotation, a second interlocking pawl, and means rendered operative by movement of said latter knob into said second position for causing said interlocking pawl to lock said stop-time tripping dial against rotation, a time driven member, an electric switch, and automatic mechanism responsive to said tripping lugs and to said time driven member for operating said electric switch.

13. In a time switch, the combination of a panel, first and second sight windows in said panel, first and second setting knobs for said first and second sight windows, one of said knobs being capable of shifting movement into an outwardly pulled position and into an inwardly pushed position, first and second numbered rotary dials having first and second sets of numbers on said dials at first and second radii located at different distances from the centers of said dials, said dials presenting said first and second sets of numbers in said first and second sight windows corresponding to pre-selected switch operating times, means mounting said first and second numbered dials for concentric rotation about a common axis, said common axis being located closer to one of said windows than to the other so as to accommodate the different radii of said first and second sets of numbers, means for rotating said first and second rotary dials in response to the rotation of said first and second setting knobs, tripping lugs moving with said dials, a time driven member, an electric switch, automatic switch actuating mechanism responsive to said tripping lugs and to said time driven member for actuating said electric switch at the pre-selected times, and means operative by the shifting movement of said shiftable knob into one of its shifted positions for restoring said electric switch to its normal position.

14. In a time switch, the combination of a panel, a sight window in said panel, a numbered rotatable dial in back of said panel adapted to present numbers in said sight window corresponding to preselected times at which it is desired to have an automatic switch operation occur, a manually rotatable and axially shiftable setting knob operatively connected to set said numbered dial by rotation of said knob, rotatable shutter means behind said panel operative to present in said sight window indicia regarding switch operation, means mounting said rotatable dial and said rotatable shutter means for concentric rotation about a common axis, said rotatable dial and said rotatable shutter means being capable of independent rotation, means responsive to axial shifting movement of said setting knob for actuating said shutter means, an electric switch, and switch operating mechanism responsive to the setting given said numbered dial.

15. In a time switch, the combination of a panel, a sight window in said panel, a numbered rotatable dial in back of said panel adapted to present numbers in said sight window corresponding to preselected times at which it is desired to have an automatic switch operation occur, a manually rotatable and axially shiftable setting knob, means responsive to rotation of said knob to set said numbered dial, rotatable shutter means behind said panel, means responsive to axial shifting movement of said knob for rotating said shutter means to present in said sight window indicia regarding switch operation, means mounting said rotatable dial and said rotatable shutter means for concentric rotation about a common axis, said rotatable dial and said rotatable shutter means being capable of independent rotation relatively to each other, a time driven member, an electric switch, switch operating mechanism responsive to said time driven member and to the setting given said numbered dial, and means responsive to the operation of said electric switch for causing operation of said shutter means.

16. In a time switch, the combination of a panel, a plurality of sight windows in said panel, a numbered rotatable dial behind said panel adapted to present numbers in one of said sight windows representing preselected times at which it is desired to have automatic switch operations occur, a setting knob operatively connected to set said numbered dial, a rotatable shutter behind said panel and operative to present indicia regarding switch operation in one of said sight windows, means mounting said rotatable dial and said rotatable shutter for concentric rotation about a common axis, said rotatable dial and said rotatable shutter being capable of independent rotation relatively to each other, an electric switch, switch operating mechanism responsive to the setting given to said numbered dial, and automatic mechanism operative to cause movement of said movable shutter at a predetermined point in the operating cycle of the time switch for automatically causing said shutter to denote through one of said sight windows a change of position of said electric switch between its open and closed positions.

17. In a time switch, the combination of a stationary bearing defining a fixed axis, a shaft rotatably mounted in said bearing on said fixed axis, a shutter dial mounted on said shaft, first and second independently rotatable numbered dials concentrically mounted on said bearing behind said shutter dial, a panel disposed in front of all three of said dials, first and second sight windows in said panel spaced on opposite sides of said fixed axis for exposing said first and second numbered dials, said shutter dial having indicia thereon adapted to be exposed through one of said sight windows in one position of said shutter dial, said shutter dial having a sight opening therethrough which upon being placed in registration with the latter sight window in said panel will expose therethrough the then aligned number on the associated one of said numbered dial, a rotatable and axially shiftable knob for actuating said dials, means responsive to rotation of said knob for rotating one of said numbered dials, means responsive to axial shifting of said knob for rotating said shutter dial independently of rotation of said numbered dials, an electric switch, and mechanism responsive to one of said dials for controlling the operation of said electric switch.

18. In a time switch, the combination of a stationary arbor sleeve, a central shaft rotatably supported in said arbor sleeve, a rotatable shutter dial mounted on said central shaft beyond the front end of said arbor sleeve, a numbered dial rotatably supported on said arbor sleeve behind said shutter dial, a panel disposed in front of both of said dials, two sight windows in said panel in front of said shutter dial spaced radially outwardly different distances from the axis of said central shaft and shutter dial, indicia on said shutter dial in one radial zone thereof adapted to be exposed at one sight window, a window opening through said shutter dial in another radial zone thereof adapted to be moved into registration with the other of said sight windows so as to expose the numbers on said numbered dial therethrough, manually operable means for moving said dials, an electric switch, time driven means, and mechanism for operating said electric switch responsive to one of said dials and said time driven member.

19. In a time switch, the combination of a panel, a stop-time indicating sight window and a cooking hours indicating sight window in said panel, a stop-time indicating dial behind said panel and presenting stop-time indicating numbers in said stop-time sight window, a stop-time tripping lug rotating with said stop-time dial, a rotatable and axially shiftable stop-time setting knob operatively connected to rotate said stop-time dial, a cooking hours indicating dial behind said panel and presenting cooking hour numbers in said cooking hours sight window, a cooking hours tripping lug rotatable concentrically of said cooking hours indicating dial, a rotatable and axially shiftable cooking hours setting knob operable to rotate said cooking hours indicating dial and said cooking hours tripping lug, means responsive to shifting motion of one of said knobs for compelling said cooking hours tripping lug to rotate concurrently with said stop-time tripping lug during setting adjustments transmitted to the latter by said stop-time setting knob, means responsive to shifting motion of the other of said knobs for disconnecting said cooking hours tripping lug from said stop-time tripping lug and connecting it with said cooking hours indicating dial during setting adjustments transmitted to the latter by said cooking hours setting knob, a time driven member, an electric switch, and switch operating mechanism responsive to said two tripping lugs and said time driven member.

20. In a time switch, the combination of a panel, sight window means in said panel, a stop-time indicating dial adapted to present numbers in said sight window means, a cooking hours indicating dial adapted to present numbers in said sight window means, a stop-time setting knob operable to rotate said stop-time dial, a cooking hours setting knob operable to rotate said cooking hours dial, both of said knobs being axially shiftable, tripping lugs moving with said indicating dials, an electric switch, an operating gear operative to actuate said switch and having two stop shoulders, a stop dog adapted to engage said stop shoulders successively, means responsive to said tripping lugs for tripping said stop dog, a cam gear operative to cam said stop dog clear of said stop shoulders, means responsive to shifting movement of one of said shafts in one direction for advancing said operating gear to present the first stop shoulder to said stop dog, means responsive to shifting movement of the other of said shafts in one direction for advancing the operating gear to present the second stop shoulder to said stop dog, and means responsive to shifting movement of one of said shafts in the opposite direction for operating said cam gear to trip said stop dog clear of said shoulders.

21. In a time switch, the combination of a panel, sight window means in said panel, a stop-time indicating dial adapted to present numbers in said sight window means, a cooking hours indicating dial adapted to present numbers in said sight window means, a stop-time setting knob operable to rotate said stop-time dial, a cooking hours setting knob operable to rotate said cooking hours dial, both of said knobs being axially shiftable, tripping lugs moving with said indicating dials, an electric switch, a spring impelled operating gear operatively connected to actuate said switch, a target dial rotated by said operating gear and having indicia thereon adapted to be presented at said sight window means, two successive stop shoulders on said operating gear, first and second stop dogs adapted to engage said stop shoulders, a time driven member, means responsive to said two tripping lugs and to said time driven member for tripping said first stop dog successively from said two stop shoulders, said second stop dog being operative to engage one of said stop shoulders after said first stop dog has been tripped from both stop shoulders, a cam gear rotating concentrically of said operating gear and operative to cam said second stop dog clear of said stop shoulders, means responsive to shifting movement of said stop-time knob in one direction for advancing said operating gear to latch the first stop shoulder of said gear against said first stop dog, means responsive to shifting movement of said cooking hours knob in one direction for advancing said operating gear to present the second stop shoulder of said operating gear into latching engagement with said first stop dog, and means responsive to shifting movement of said stop-time knob in the opposite direction for operating said cam gear so as to cam said second stop dog into a position clearing said stop shoulders.

22. In a time switch, the combination of a panel, a stop-time indicating sight window and a cooking hours indicating sight window in said panel, a stop-time indicating dial presenting stop-time indicating numbers in said stop-time sight window, a stop-time tripping dial having a tripping lug rotating with said stop-time indicating dial, a stop-time setting knob operatively connected to rotate said stop-time indicating dial, a cooking hours indicating dial presenting cooking hour numbers in said cooking hours sight window, a cooking hours tripping dial having a tripping lug adapted to be rotated with said cooking hours indicating dial, a cooking hours setting knob operable to rotate said cooking hours indicating dial, selective gear transmission mechanism for compelling said cooking hours tripping dial to rotate concurrently with said stop-time tripping dial during setting adjustments transmitted to said stop-time tripping dial by said stop-time setting knob, and for compelling said cooking hours tripping dial to rotate concurrently with said cooking hours indicating dial during setting adjustments transmitted to said cooking hours indicating dial by said cooking hours setting knob, an interlocking pawl for holding said latter dial against rotation while setting adjustments are being transmitted through said stop-time setting knob, an interlocking pawl operative to hold said stop-time tripping dial against rotation while setting adjustments are being transmitted through said cooking hours setting knob, a time driven member, an electric switch, and switch operating mechanism responsive to said two tripping dials and to said time driven member.

References Cited in the file of this patent

UNITED STATES PATENTS

| | | |
|---|---|---|
| 1,602,260 | Hicks | Oct. 5, 1926 |
| 1,982,495 | Browning | Nov. 27, 1934 |
| 2,060,537 | Smith | Nov. 10, 1936 |
| 2,200,110 | Anderson | May 7, 1940 |
| 2,202,721 | Anderson | May 28, 1940 |
| 2,472,818 | Gardes | June 14, 1949 |
| 2,485,195 | Gallagher et al. | Oct. 18, 1949 |
| 2,587,187 | McCormick | Feb. 26, 1952 |
| 2,605,833 | Bliss | Aug. 5, 1952 |
| 2,607,188 | Bourquin | Aug. 19, 1952 |
| 2,657,283 | Harris | Oct. 27, 1953 |
| 2,663,786 | Illian | Dec. 22, 1953 |
| 2,691,085 | Beatty | Oct. 5, 1954 |
| 2,733,764 | Bliss | Feb. 7, 1956 |
| 2,824,194 | Moorehead | Feb. 18, 1958 |
| 2,826,651 | Clark | Mar. 11, 1958 |
| 2,866,106 | Gallagher et al. | May 12, 1959 |

FOREIGN PATENTS

| | | |
|---|---|---|
| 540,902 | Canada | May 14, 1957 |